US012715339B2

(12) United States Patent
Christensen et al.

(10) Patent No.: US 12,715,339 B2
(45) **Date of Patent: *Aug. 25, 2026**

(54) SYSTEM AND METHOD FOR ADJUSTING AN INTERIOR CONFIGURATION OF A VEHICLE IN RESPONSE TO A VEHICULAR ACCIDENT

(71) Applicant: STATE FARM MUTUAL AUTOMOBILE INSURANCE COMPANY, Bloomington, IL (US)

(72) Inventors: Scott T. Christensen, Salem, OR (US); Brian Mark Fields, Phoenix, AZ (US); Stephen R. Prevatt, Normal, IL (US); Steve Roberson, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 8 days.

This patent is subject to a terminal disclaimer.

(21) Appl. No.: 18/648,770

(22) Filed: Apr. 29, 2024

(65) Prior Publication Data

US 2024/0270128 A1 Aug. 15, 2024

Related U.S. Application Data

(63) Continuation of application No. 17/949,668, filed on Sep. 21, 2022, now Pat. No. 12,024,069, which is a (Continued)

(51) Int. Cl.
*B60N 2/02* (2006.01)
*B60N 2/427* (2006.01)
(Continued)

(52) U.S. Cl.
CPC ....... *B60N 2/0276* (2013.01); *B60N 2/42736* (2013.01); *B60R 21/013* (2013.01); (Continued)

(58) Field of Classification Search
None
See application file for complete search history.

(56) References Cited

U.S. PATENT DOCUMENTS 3,040,925 A 6/1962 Mills
4,252,340 A 2/1981 Egging
(Continued)

FOREIGN PATENT DOCUMENTS

CN 106043076 A 10/2016
EP 3239686 A1 11/2017
(Continued)

OTHER PUBLICATIONS

Office Action in U.S. Appl. No. 15/887,405 dated Nov. 5, 2019, 17 pages.
(Continued)

*Primary Examiner* — Hongye Liang
(74) *Attorney, Agent, or Firm* — MARSHALL, GERSTEIN & BORUN LLP

(57) ABSTRACT

A system and method are provided for controlling an interior configuration of a vehicle following a collision. Sensor data that includes, or is derived from data that includes, data collected by one or more sensors is received, and a vehicle accident condition indicative of an accident having occurred is detected by processing the sensor data. After detecting the vehicle accident condition, an actuator component is caused to prevent a passenger from adjusting an interior vehicle component outside a predetermined range of physical configurations, while allowing the passenger to adjust the interior vehicle component within the predetermined range of physical configurations.

20 Claims, 11 Drawing Sheets

Related U.S. Application Data continuation of application No. 15/948,204, filed on Apr. 9, 2018, now Pat. No. 11,485,254.

(51) Int. Cl.
*B60R 21/013* (2006.01)
*B60R 21/01* (2006.01)

(52) U.S. Cl.
CPC ............... *B60R 2021/01013* (2013.01); *B60R 2021/01252* (2013.01)

(56) References Cited

U.S. PATENT DOCUMENTS 4,518,183 A 5/1985 Lee
4,836,080 A 6/1989 Kite, III et al.
5,570,903 A 11/1996 Meister et al.
5,748,477 A 5/1998 Katoh
5,785,347 A 7/1998 Adolph et al.
5,975,231 A 11/1999 Hirato
6,026,340 A 2/2000 Corrado et al.
6,490,515 B1 12/2002 Okamura et al.
7,158,016 B2 1/2007 Cuddihy et al.
7,178,622 B2 2/2007 Eberle et al.
7,798,275 B2 9/2010 Fehring et al.
8,157,045 B2 4/2012 Hashimoto et al.
8,260,502 B2 9/2012 Yonak et al.
9,199,563 B2 12/2015 Howard et al.
9,311,271 B2 4/2016 Wright
9,633,487 B2 4/2017 Wright
9,663,052 B2 5/2017 Rao et al.
9,830,748 B2 11/2017 Rosenbaum
9,886,841 B1 2/2018 Nave et al.
9,990,782 B2 6/2018 Rosenbaum
10,192,369 B2 1/2019 Wright
10,198,879 B2 2/2019 Wright
10,269,190 B2 4/2019 Rosenbaum
10,300,832 B1 5/2019 Folks et al.
10,324,463 B1 6/2019 Konrardy et al.
10,437,232 B2 10/2019 Langer et al.
10,467,824 B2 11/2019 Rosenbaum
11,227,452 B2 1/2022 Rosenbaum
11,407,410 B2 8/2022 Rosenbaum
11,524,707 B2 12/2022 Rosenbaum
11,594,083 B1 2/2023 Rosenbaum
2002/0003345 A1 1/2002 Stanley et al.
2002/0070697 A1* 6/2002 Maldonado ............. E05F 15/72 318/445
2002/0147535 A1* 10/2002 Nikolov ............... B60N 2/4214 340/425.5
2002/0188393 A1 12/2002 Yokota et al.
2004/0049331 A1 3/2004 Schneider
2004/0107033 A1 6/2004 Rao et al.
2005/0069839 A1 3/2005 Denne
2005/0082851 A1 4/2005 Nakanishi
2005/0131606 A1 6/2005 Motozawa et al.
2005/0240329 A1 10/2005 Hirota
2006/0186702 A1 8/2006 Kisanuki et al.
2007/0083311 A1 4/2007 Tabe
2007/0107969 A1 5/2007 Ootani et al.
2007/0223910 A1 9/2007 Aoki et al.
2008/0040004 A1 2/2008 Breed
2008/0162002 A1 7/2008 Bacher et al.
2009/0143943 A1 6/2009 Jaramillo et al.
2009/0152041 A1 6/2009 Kim
2009/0152880 A1 6/2009 Donovan
2009/0242308 A1 10/2009 Kitte et al.
2009/0326766 A1 12/2009 Wang
2010/0066116 A1 3/2010 Coenen
2011/0140404 A1 6/2011 Odate
2011/0172882 A1 7/2011 Schrader
2011/0221247 A1 9/2011 Hashimoto et al.
2011/0295467 A1 12/2011 Browne et al.
2012/0166229 A1 6/2012 Collins et al.
2012/0215403 A1 8/2012 Tengler et al.
2013/0226372 A1 8/2013 Kim et al.
2014/0135598 A1 5/2014 Weidl et al.
2014/0309790 A1 10/2014 Ricci
2014/0339391 A1 11/2014 Hsu et al.
2014/0358378 A1 12/2014 Howard et al.
2015/0224845 A1 8/2015 Anderson et al.
2015/0375756 A1 12/2015 Do et al.
2016/0277911 A1 9/2016 Kang et al.
2016/0297430 A1 10/2016 Jones et al.
2017/0182970 A1 6/2017 Wu
2017/0313208 A1 11/2017 Lindsay
2018/0094966 A1 4/2018 Buether
2018/0164119 A1 6/2018 Becker
2018/0272977 A1 9/2018 Szawarski et al.
2018/0281625 A1 10/2018 Akaba et al.
2018/0368191 A1 12/2018 Vutukuri et al.
2019/0023161 A1 1/2019 Sullivan et al.
2019/0023209 A1 1/2019 Freienstein et al.
2019/0096256 A1 3/2019 Rowell
2022/0092893 A1 3/2022 Rosenbaum
2022/0340148 A1 10/2022 Rosenbaum
2023/0060300 A1 3/2023 Rosenbaum

FOREIGN PATENT DOCUMENTS

EP 3578433 B1 8/2020
EP 3730375 B1 10/2021
EP 3960576 A1 3/2022
EP 4190659 A1 6/2023
EP 4190660 A1 6/2023

OTHER PUBLICATIONS

Office Action in U.S. Appl. No. 15/887,405 dated Apr. 28, 2020, 20 pages.
Office Action in U.S. Appl. No. 15/887,405 dated Sep. 16, 2020, 18 pages.
Office Action in U.S. Appl. No. 15/887,405 dated Dec. 1, 2020, 18 pages.
Office Action in U.S. Appl. No. 15/887,405 dated Apr. 13, 2021, 24 pages.
Office Action in U.S. Appl. No. 15/887,405 dated Sep. 21, 2021, 24 pages.

* cited by examiner 102A
140A
148A
142A
144A 102B
144B
148B
140B
142B 102C
142C
148C
146C
144C
140C

Figure 2J 148.1J
146.1J
147.1J
144.1J
142.1J
140.1J
140J
140.2J
142.2J
148.2J
144.2J
147.2J
144.2J

SYSTEM AND METHOD FOR ADJUSTING AN INTERIOR CONFIGURATION OF A VEHICLE IN RESPONSE TO A VEHICULAR ACCIDENT

CROSS-REFERENCE TO RELATED APPLICATIONS

This is a continuation of U.S. patent application Ser. No. 17/949,668, filed Sep. 21, 2022, which is a continuation of U.S. patent application Ser. No. 15/948,204, filed Apr. 9, 2018 and entitled "System and Method for Adjusting an Interior Configuration of a Vehicle in Response to a Vehicular Accident," the entirety of which is hereby incorporated herein by reference.

FIELD OF DISCLOSURE

The present disclosure generally relates to vehicle safety. More particularly, the present invention disclosure relates to systems and methods for modifying and controlling the interior configuration of a vehicle in response to detecting a vehicle accident condition, for the purpose of improving vehicle passenger safety.

BACKGROUND

The interior configuration and layout of a vehicle has changed only incrementally since the invention of automobiles over a century ago. Conventional interior vehicle configurations were adapted so that a human could effectively, safely, and manually operate a vehicle. Accordingly, existing interior vehicle configurations are confined to certain layouts to accommodate these requirements. For instance, space in the vehicle must be devoted to the steering wheel, brake, accelerator, and gear shifter, and the driver must be positioned to accessibly operate this equipment while having a clear view of the road and traffic in all directions. Additionally, user interface control panels must also be arranged to conform to this layout. In existing vehicles, a vehicle operator has no way to adjust his/her physical position without abandoning the vehicle controls, thereby increasing the likelihood of an accident. Therefore, a driver and/or passenger is seemingly limited to a certain position regardless of driving conditions and/or the vehicle's actions, which in turn can place detrimental force and strain on a vehicle driver and/or passenger's body.

Existing vehicle safety technology has been limited in form and/or function in order to also conform to existing configurations. Each year millions of individuals are injured as a result of vehicular accidents emanating from operator error, inattention, inexperience, misuse, or distraction; inclement weather conditions; treacherous road conditions; and other driving environment conditions. While existing vehicle safety technologies have improved vehicle driver and passenger safety, many of these technologies, such as airbags, do not deploy until after a vehicle has already been involved in a collision. Similarly, other existing vehicle safety technologies, such as seatbelts, can only perform a single function and provide limited or no benefit in certain situations. In some instances, the existing safety technology installed in a vehicle can cause more harm than it prevents because of the specific type of accident and/or the physical attributes of the vehicle's passenger. A passenger's specific body position during a collision can affect how his/her body is impacted by the collision, and just a few inches or degrees of difference in body positioning can be the difference between a passenger walking away from a collision alive and unscathed, as opposed to suffering life-altering injuries or death. However, given the near-instantaneous nature of most accidents, it is almost impossible for a driver or passenger to brace for impact or make changes to his/her position to prevent injury.

After the collision occurs, a new set of problems arises. In some instances, the accident is so severe that an individual is incapacitated and/or trapped in the vehicle, and thus cannot safely exit the vehicle. While emergency personnel, such as first responders, may be able to extract an individual from the vehicle, the process can be time and labor intensive. Additionally, extracting an individual from a vehicle typically requires special equipment that not all emergency personnel possess, such as "the jaws of life" or underwater breathing equipment. Accident-induced injuries can be exacerbated and lives lost because emergency personnel were unable to extract an individual fast enough. For example, if a vehicle has become submerged and is sinking, and if emergency personnel cannot overcome the physical obstacles, it may not be possible to administer medical attention to an incapacitated vehicle passenger in a timely manner. In such an instance, breaking a conventional window or opening a door, in order to get to the injured/trapped individual, is substantially more difficult than when the vehicle is on land because of the additional pressure forces caused by the water. Conversely, in a rollover crash, emergency personnel may be faced with obstacles, like trying to saw through the structural base of the car and/or removing a multitude of large and heavy vehicle parts (e.g., doors, windows, seat, seatbelts, etc.), in order to free the incapacitated/trapped passenger.

While racing against the clock to extract a passenger, emergency personnel are typically unaware of an individual's exact injuries. The lack of knowledge about an individual's injuries and/or pre-existing conditions can lead to emergency personnel further exacerbating the accident-induced injury, aggravating a pre-crash existing condition, and/or causing additional injuries if the individual is not extracted in a specific manner. For example, an individual who suffers a spinal injury in a collision may need to be immobilized and removed in a specific manner in order to prevent further injury to his/her spine. However, without knowledge of the injury, emergency personnel cannot carry out the necessary specialized extraction procedures, and thus risk causing further injury to the individual.

The increase in autonomous and semi-autonomous vehicles has decreased the need for vehicles to be operated by humans. Autonomous and semi-autonomous vehicles augment vehicle operators' information or replace vehicle operators' control commands to operate the vehicle, in whole or part, with computer systems based upon information collected by equipment within, or attached to, the vehicle. Consequently, there is a decreased need for vehicles to be confined to features and configurations, such as the interior layout, specifically designed to accommodate human-operated vehicles.

SUMMARY

The present application disclosure provides a system and method for modifying the physical configuration of an interior component of a vehicle in response to detecting a vehicle accident condition indicative of the vehicle being involved in an accident.

In one embodiment, a system for controlling an interior configuration of a vehicle following a collision comprises:

(1) an interior vehicle component; (2) an actuator component configured to adjust a physical configuration of the interior vehicle component; (3) one or more sensors configured to collect data corresponding to a state of the vehicle, an action of the vehicle, and/or an internal or external environment of the vehicle; and (4) one or more processors. The one or more processors are configured to: (1) receive sensor data that includes, or is derived from data that includes, the data collected by the one or more sensors; (2) detect, by processing the sensor data, a vehicle accident condition indicative of an accident having occurred; and/or (3) after the one or more processors detect the vehicle accident condition, cause the actuator component to prevent a passenger from adjusting the interior vehicle component outside a predetermined range of physical configurations, while allowing the passenger to adjust the interior vehicle component within the predetermined range of physical configurations.

In another embodiment, a method for controlling an interior configuration of a vehicle following a collision comprises: (1) receiving, by one or more processors, sensor data that includes, or is derived from data that includes, data collected by one or more sensors; (2) detecting, by the one or more processors processing the sensor data, a vehicle accident condition indicative of an accident having occurred; and/or (3) after detecting the vehicle accident condition, causing, by the one or more processors, an actuator component to prevent a passenger from adjusting an interior vehicle component outside a predetermined range of physical configurations, while allowing the passenger to adjust the interior vehicle component within the predetermined range of physical configurations.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

FIG. 2J illustrates an embodiment in which one or more components of an interior vehicle component may be adjusted from a first physical configuration to a second physical configuration.

DETAILED DESCRIPTION

The embodiments described herein relate to, inter alia, systems and methods for adjusting the physical configuration, or restricting the movement, of one or more interior components of a vehicle in response to detecting a vehicle accident condition posing a risk to the safety of a passenger of the vehicle and/or affecting the operation of the vehicle.

Figure 1A:
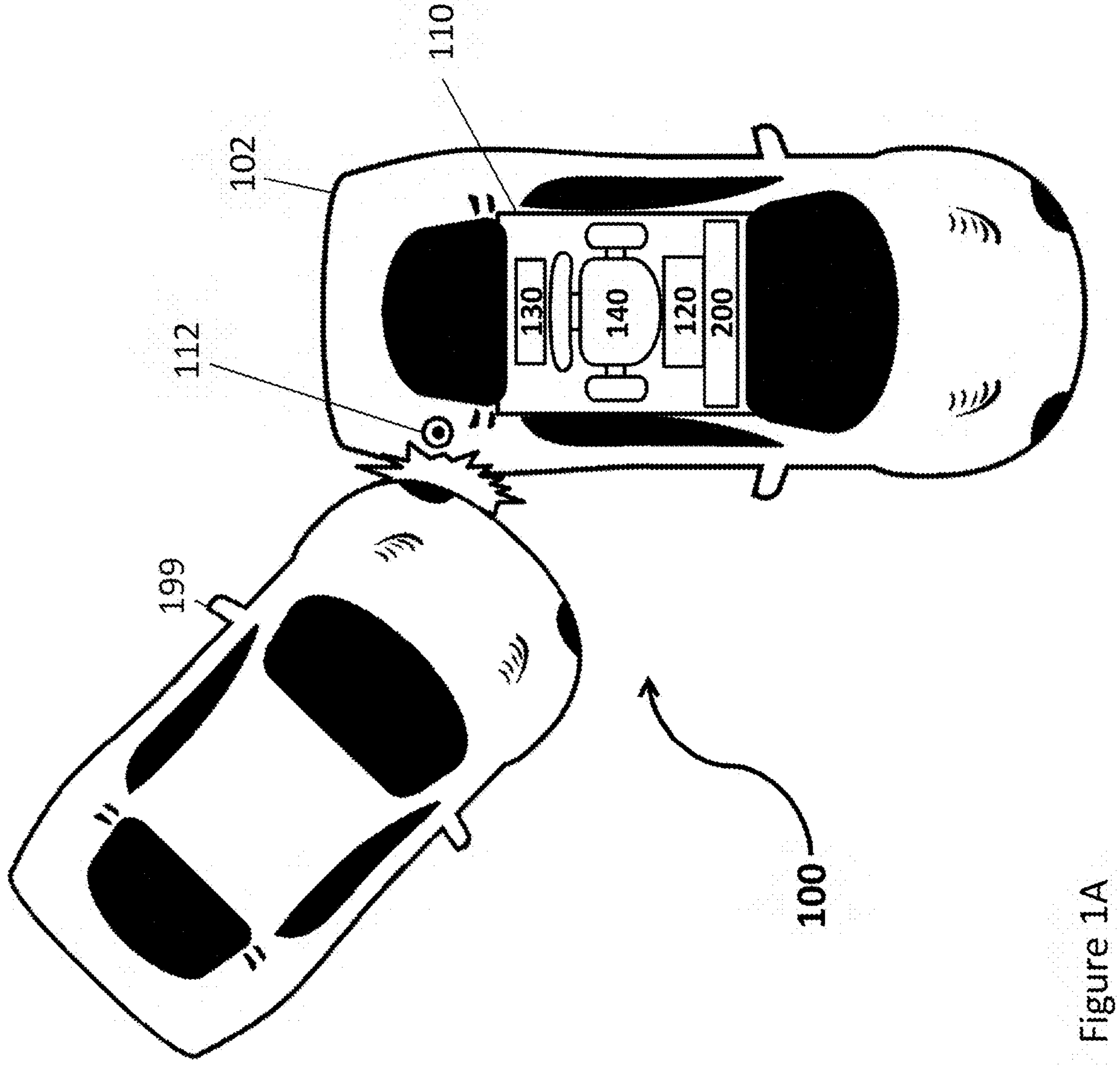
FIG. 1A depicts a block diagram of a first embodiment of a system for controlling an interior vehicle component.

FIG. 1A depicts a block diagram of a first embodiment of a system 100 for controlling an interior vehicle component. The system 100 includes a vehicle 102, vehicle-based components 110, and one or more objects external to the vehicle 199 (hereinafter "external object 199"). The vehicle-based components 110 may include a sensor 112, a vehicle computer 200, an interior data collection component 120, an actuator component 130, and an interior vehicle component 140. In operation, data relating to a vehicle (e.g., operation of the vehicle, and/or the vehicle's surrounding environment) is collected by the sensor 112, or a component coupled to the sensor 112, and transmitted to the vehicle computer 200. The vehicle computer 200 analyzes this data to detect a vehicle accident condition. When the vehicle computer 200 detects the vehicle accident condition, the vehicle computer 200 causes the actuator component 130 to adjust the movement of the interior vehicle component 140 from a first physical configuration to a second physical configuration, or to restrict the movement of the interior vehicle component 140.

Although the system 100 is shown in FIG. 1 to include one vehicle 102, one sensor 112, one interior data collection component 120, one actuator component 130, one interior vehicle component 140, one adjacent object 199, and one vehicle computer 200, it should be understood that different numbers of each may be utilized. For example, the system 100 may include a plurality of sensors 112, all of which may be coupled to the vehicle 102 and in communication with the vehicle computer 200. Furthermore, the storage or processing performed by the vehicle computer 200 may be distributed among a plurality of computers comprising a network.

The vehicle 102 may be an automobile, bus, motorcycle, boat, airplane, train, helicopter, tractor, jet ski, forklift, or other machine employed by a user to travel, and may be an autonomous vehicle, a semi-autonomous vehicle, or a fully manual vehicle.

The sensor 112 is configured to collect sensor data representative of the state of the vehicle 102, an action of the vehicle 102, an internal environment of the vehicle 102, and/or an external environment of the vehicle 102. An internal environment of the vehicle 102 is the physical environment and/or space inside of the vehicle 102. An external environment is the physical environment and/or space outside of the vehicle 102. The sensor 112 may be affixed on, to, and/or in the vehicle 102 or a component of the vehicle 102. The sensor 112 may be, for example, a radar unit, LIDAR unit, motion sensor (e.g., accelerometer), ultrasonic sensor, infrared sensor, inductance sensor, camera, microphone, and/or any other type of sensor configured to collect data representative of the internal and/or external environment of the vehicle 102. In some embodiments, the sensor 112 may include or be coupled to a transceiver, GPS unit, and/or any other suitable piece(s) of equipment configured to collect data representative of the internal and/or external environment of the vehicle 102. In some embodiments where the sensor 112 includes or is coupled to a transceiver, sensor data, or other data representative of the internal and/or external environment of the vehicle 102, may be received and/or transmitted using wireless communication technology, such as Bluetooth, Wi-Fi, dedicated short-range communications (DSRC), or other existing or later-developed communications protocols. In some embodiments the sensor 112 may actively or passively scan the internal and/or external environment of the vehicle for a vehicle accident condition.

In some embodiments the sensor 112 collects sensor data corresponding to the physical condition, performance, and/or actions of the vehicle 102, a subsystem of the vehicle 102, and/or a component of the vehicle 102. The vehicle, vehicle subsystems, and/or vehicle components may include hardware, firmware and/or software subsystems that control (and possibly monitor) the various operational parameters of the vehicle 102. For example, the sensor data may correspond to the condition and/or actions of a braking subsystem to control how the brakes of vehicle 102 are applied (e.g., brake pads condition, amount of fluid in the brakes, an absolute or relative measure of applied braking force, or a binary indicator of whether the brakes are being applied at all, etc.), a speed subsystem to control how fast the vehicle 102 is being driven (e.g., corresponding to a speedometer reading, an accelerometer measurement, and/or a driver input such as depression of a gas pedal, etc.), and/or a steering subsystem to control how the vehicle 102 is being steered (e.g., based upon the driver's manipulation of a steering wheel, or based upon automated steering control data, etc.). The vehicle 102 may also include a diagnostics subsystem that generates sensor data pertaining to the operation of vehicle 102, such as warning/alert information to indicate that one or more components of vehicle 102 is/are in need of replacement, an upgrade, and/or servicing. The sensor 112 may also be configured to collect, receive, transmit, and/or generate data relating to current, expected/future, and/or past physical conditions, performance, and/or actions of the vehicle 102, a subsystem of the vehicle 102, and/or a component of the vehicle 102.

In some embodiments, the sensor 112 includes an accelerometer, tachometer, speedometer, etc. that may generate sensor data based on the sensed operation of the vehicle 102. In such embodiments, these sensors (or related systems) may transmit the sensor data to the vehicle computer 200.

In some embodiments the sensor 112 is a microphone configured to recognize audio input, commands, and/or sounds (e.g., windows breaking, air bags deploying, tires skidding, conversations or voices of other drivers and/or pedestrians, music, rain, snow, wind noise, and/or other sounds) heard within and/or external to the vehicle 102 that would enable the processor 202 to detect a vehicle accident condition.

Examples of the external object 199 include, but are not limited to, one or more other vehicles, buildings, pedestrians, overpasses, curbs, guardrails, concrete barrier, traffic signs, shrubbery, structures, animals, and/or any other physical element that could come into physical contact with the vehicle 102 and be involved in an accident/crash/collision. In some embodiments, the sensor 112 may collect data for determining the location, position, movement, speed, route, destination, and/or trajectory of external object 199. The sensor 112 may also be configured to collect, receive, transmit, and/or generate data relating to current, expected/future, and/or past driving conditions, weather conditions, traffic conditions, road integrity, terrain conditions, construction, past/typical driving behavior of an adjacent vehicle, the external object 199, the internal environment of the vehicle 102, and/or the environment external to the vehicle 102. Data collected, received, or generated by the sensor 112, or a component coupled to the sensor 112, may be transmitted to the vehicle computer 200, or a component of the vehicle computer 200.

In some embodiments, the sensor 112 may include or be coupled to a transceiver configured to receive third party data from the external object 199, a server, a network, an infrastructure component, and/or another source. The infrastructure components may include smart infrastructure or devices (e.g., sensors, transmitters, etc.) disposed within or communicatively connected to buildings, transportation or other infrastructure, such as roads, bridges, viaducts, terminals, stations, fueling stations, traffic control devices (e.g., traffic lights, toll booths, entry ramp traffic regulators, crossing gates, speed radar, cameras, etc.), bicycle docks, footpaths, or other infrastructure system components. Examples of other sources that may transmit data to the sensor 112 include mobile devices (smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, and/or other computing devices); smart vehicles; dash or vehicle mounted systems or original telematics devices; buildings; pedestrians; public transportation systems; smart street signs or traffic lights; smart infrastructure, roads, or highway systems (including smart intersections, exit ramps, and/or toll booths); smart trains, buses, or planes (including those equipped with Wi-Fi or hotspot functionality); smart train or bus stations; internet sites; aerial, drone, or satellite images; third party systems or data; nodes, relays, and/or other devices capable of wireless RF (Radio Frequency) communications; and/or other devices or systems that capture image, audio, or other data and/or are configured for wired or wireless communication. In some embodiments, the sensor data collected may be derived from police or fire departments, hospitals, and/or emergency responder communications; police reports; municipality information; automated Freedom of Information Act requests; and/or other data collected from government agencies and officials.

In some embodiments, the collected sensor data may also be transmitted to a third party receiver, database, server, infrastructure component, and/or network. In some embodiments, the collected sensor data may be used to adjust, generate, and/or update an insurance policy, premium, rate, discount, and/or reward for the specific driver, passenger, and/or the insured individual (e.g., if a driver has expressly agreed to participate in a program involving data collection/sharing). The sensor 112 may be originally installed by a manufacturer of the vehicle 102, or installed as an aftermarket modification or addition to the vehicle 102.

The sensor 112 may include a clock configured to time-stamp the date and time that sensor data is collected by the sensor 112.

Figure 1B:
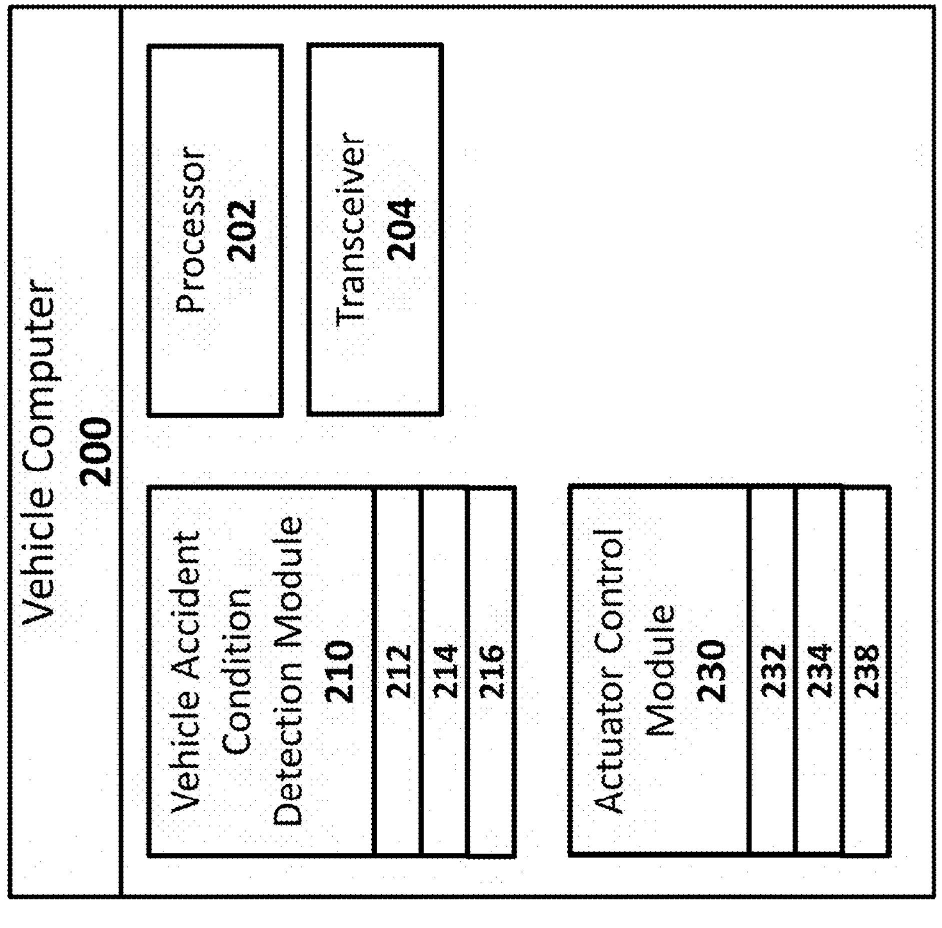
FIG. 1B is a detailed block diagram of a vehicle computer that may be used in the system of FIG. 1A.

FIG. 1B depicts a detailed block diagram of the vehicle computer 200, according to one embodiment. The vehicle computer 200 is configured to receive, transmit, process, analyze, and/or detect data relating to the vehicle 102 and its environment, and monitor/control various features, functions, and components of the vehicle 102. The vehicle computer 200 may comprise one or more processors 202, a transceiver 204, a vehicle accident condition detection module 210, and an actuator control module 230. The vehicle computer 200 may be originally installed by a manufacturer of the vehicle 102, or installed as an aftermarket modification or addition to the vehicle 102. The vehicle computer 200 may be configured to be in communication with the sensor 112, a component coupled to the sensor 112 (e.g., a transceiver), the interior data collection component 120, and/or the actuator component 130 of FIG. 1A. The transceiver 204 is configured to receive and transmit data, and may be designed to send and receive information/data according to predetermined specifications, such as a dedicated short-range communication (DSRC) channel, wireless telephony, Wi-Fi, or other existing or later-developed communications protocols. The vehicle computer 200 may include a user interface for a passenger to view, enter, and/or select past, current, and/or future information pertaining to his/herself, the vehicle 102, another passenger of the vehicle 102, the interior configuration of the vehicle 102, the internal environment of the vehicle 102, and/or the environment external to vehicle 102.

The vehicle computer 200 may further include a number of software applications stored in in the program memory of the vehicle accident condition detection module 210 and/or the actuator control module 230. In some embodiments the aforementioned modules may all be stored as software modules within the same program memory. The various software applications on the vehicle computer 200 may include specific programs, routines, or scripts for performing processing functions associated with the methods and functions described herein. Additionally, the various software applications on the vehicle computer 200 may include general-purpose software applications for data processing, database management, data analysis, network communication, web server operation, or other functions described herein or typically performed by a server. The various software applications may be executed on the same processor 202 or on different processors. Additionally, or alternatively, the software applications may interact with various hardware modules that may be installed within or connected to the vehicle computer 200. Such modules may implement part of or all of the various exemplary methods discussed herein or other related embodiments. The memory units discussed herein may include one or more types of memory, including volatile memory (e.g., DRAM, SRAM, etc.), non-volatile memory (e.g., ROM, EEPROM, etc.), and/or secondary storage (e.g., hard drive, solid state, etc.).

The vehicle accident condition detection module 210 is configured to receive, store, and analyze the sensor data to determine whether a vehicle accident condition has been detected. A vehicle accident condition may be a physically detectable condition, phenomenon, or event that causes damage to a vehicle 102, injures a passenger of the vehicle 102, makes the vehicle 102 essentially inoperable, and/or prevents (absent some kind of further, ameliorative action) a passenger of the vehicle 102 from being able to safely and/or easily exit the vehicle 102. Examples of a vehicle accident condition which the processor 202 may be configured to detect include, but are not limited to, a vehicle collision with an external object, a fire (within the vehicle and/or external to the vehicle), a submerged/sinking vehicle, a rolled over vehicle, an inoperable (or partially inoperable) vehicle, a damaged/malfunctioning/non-functional subsystem and/or component of the vehicle, a vehicle emission condition, an interior vehicle condition, a weather condition, a traffic condition, a road integrity condition, a terrain condition, and/or any other condition that may affect safe operation of the vehicle 102 or a vehicle passenger's ability to safely exit the vehicle 102. The vehicle accident condition detection module 210 may include a sensor data storage 212, a vehicle accident condition detection program memory 214, and a vehicle accident condition detection criteria data storage 216. The sensor data storage 212 is configured to store the sensor data received, via the transceiver 204, from the sensor 112. The vehicle accident condition detection program memory 214 stores program instructions for detecting one or more vehicle accident conditions based on the sensor data collected by the sensor 112. The vehicle accident condition detection program may comprise one or more algorithms, machine learning techniques, data comparison, and/or other techniques for detecting a vehicle accident condition based on the sensor data. In some embodiments, a vehicle accident condition may be detected based on criteria data stored in the vehicle accident condition detection criteria data storage 216, indicative of a threshold and/or other criteria defining when a particular vehicle accident condition exists.

Examples of a vehicle collision may include instances in which the vehicle 102 has come into physical contact with another vehicle, a building, a pedestrian, a traffic control device (e.g., a stop sign, stoplight, road median, etc.), shrubbery (e.g., a tree, bush, etc.), a structure, an animal, terrain (e.g., a ditch, trench, hill, mountain, gorge, ravine, etc.), and/or otherwise been damaged. Examples of a submerged/sinking vehicle may include, but are not limited to, instances in which the vehicle 102 is stuck in, surrounded by, or confined to a body of water, sand, mud, snow, or other type of substance or terrain that prevents the vehicle from operating normally and requires extraction of a passenger. Examples of an inoperable (or partially inoperable) vehicle, and/or a damaged/malfunctioning/non-functional subsystem (and/or component) of the vehicle may include, but are not limited to a flat tire, broken window, worn out brake pads, low/dead battery, low/empty fuel tank, damaged engine, damaged transmission, damaged gear shifter, and/or other condition that prevents the vehicle from being operated. Examples of a vehicle emission condition may include, but are not limited to, the amount/levels of carbon monoxide, fuel, smoke, leaking fluid, and/or any other physically detectable substances emitted from the vehicle. Examples of an interior vehicle condition may include, but are not limited to the existence and/or the amount/levels of carbon monoxide, fire, smoke, fumes, and/or any other physically detectable substance within the internal environment of the vehicle that may be harmful to a passenger and/or require the passenger to exit the vehicle.

Examples of a weather condition which the processor 202 may be configured to detect include, but are not limited to, rain, snow, hail, sleet, ice, fog, clouds, wind, and/or excess sun. Examples of a traffic condition which the processor 202 may be configured to detect include heavy traffic, vehicle congestion levels, bumper-to-bumper traffic, an accident, a traffic sign (e.g., a stop sign), presence of pedestrians, pedestrian congestion levels, a traffic light and its current condition (e.g. green, yellow, or red), a closed street, a speed limit, an intersection, tight turn, and/or any other detectable driving related condition. Examples of a road integrity condition which the processor 202 may be configured to detect include, but are not limited to, a pothole, unpaved road, speed control device, road slipperiness, road firmness, and/or any other detectable condition related to the physical condition of a road. Examples of a terrain condition which the processor 202 may be configured to detect include, but are not limited to, a body of water, a ditch, a ravine, road slope, rolling hills, mountains, desert terrain, beach terrain, city driving conditions, rural driving conditions, a winding road, lane width, and/or any other detectable manmade and/or natural conditions that may affect a road.

In analyzing the sensor data to detect a vehicle accident condition, the processor 202 may analyze historical accident information and/or test data involving vehicles having autonomous or semi-autonomous functionality. Factors that may be analyzed and/or accounted for by the processor 202 may include, but are not limited to, points of impact, vehicle type/style, vehicle behavior, vehicle speed, type of road, time of day, type/length of trip, level of pedestrian traffic, level of vehicle congestion, and/or other factors that could affect the operation of a vehicle and/or safety of a vehicle passenger following an accident.

The actuator control module 230 is configured to determine a better/safer physical configuration for the interior vehicle component 140 and to cause the actuator component 130 to adjust the physical configuration of, and/or restrict movement of, the interior vehicle component 140 in response to the processor 202 detecting the vehicle accident condition. The actuator control module 230 may include an actuator program memory 232, an IVC configuration data storage 234, and/or passenger profile data storage 238. The actuator program memory 232 may include program instructions that are executed to cause the actuator component 130 to move/restrict movement of the interior vehicle component 140. It should be appreciated that the term IVC is an abbreviation for the term "Interior Vehicle Component."

Data corresponding to physical configurations of the interior vehicle component 140 may be stored in the IVC configuration data storage 234. For example, the IVC configuration data storage 234 may contain data indicative of a default physical configuration, a current/initial physical configuration, a physical configuration set by a passenger, and/or a set of potential physical configurations to which the interior vehicle 140 may be adjusted in response to detecting a vehicle accident condition. In some embodiments, IVC configuration data may correspond to a range of physical configurations that the interior vehicle component 140 may be adjusted or limited/restricted to in response to the processor 202 detecting (and/or for as long as the processor 202 detects) the vehicle accident condition. In some embodiments, the physical configuration of the interior vehicle component 140 may be predetermined, determined in real-time, determined in response to passenger data stored in the passenger profile data storage 238, and/or determined in response to the processor 202 detecting a vehicle accident condition.

In determining a physical configuration of the interior vehicle component 140, the processor 202 may take into account a passenger's preferences, characteristics, and/or traits. The passenger profile data storage 238 may contain data indicative of one or more passenger's physical characteristics, biometric traits, pre-existing health conditions, mental health status, and/or any other physiological conditions. Examples of a passenger's preferences may include a passenger selected and/or preferred orientation, position, and/or configuration of the interior vehicle component 140. Examples of passenger profile data include, but are not limited to, a passenger's height, weight, gender, age, education level, profession, disabilities/impairments/limitations, and/or pregnancy status. In some embodiments, passenger profile data is collected using the interior data collection component 120 and/or transmitted to the vehicle computer 200 from a third party device, server, network, or other remote database.

Referring now back to FIG. 1A, the interior data collection component 120 is configured to collect data indicative of an interior configuration of the vehicle 102 and/or data corresponding to one or more passengers inside the vehicle 102, and transmit the collected data to the vehicle computer 200, a component of the vehicle computer 200, and/or a third party. For example, the interior data collection component 120 may be configured to collect data representing the physical configuration of the interior vehicle component 140, the presence of one or more passengers in the vehicle 102, and/or the position of the one or more passengers (e.g., relative to the interior vehicle component 140).

The interior data collection component 120 may also be configured to collect data indicative of the one or more passengers' physical characteristics, biometric traits, pre-existing health conditions, and/or any other physiological conditions. The interior data collection component 120 may include one or more sensors, such as an occupancy sensor, a motion sensor, a thermometer, a weight sensor, a pressure sensor, a biometric sensor, a camera, a microphone, and/or any other device equipped to collect data relating to any other measurable event or physical phenomenon within the vehicle 102. For example, the interior data collection component 120 may be configured to collect data indicative of whether a vehicle passenger is unconscious as a result of the vehicle 102 colliding with another vehicle (the vehicle accident condition).

The interior data collection component 120 may comprise multiple components. The interior data collection component 120 may include a clock configured to time-stamp the date and time that data is collected by the interior data collection component 120. The interior data collection component 120 may be removably or fixedly installed within the vehicle 102 and may be disposed in various arrangements to collect passenger and/or interior vehicle component 140 physical configuration data. The interior data collection component 120 may be a mobile device, conducting electrode, and/or wearable device affixed to a passenger of the vehicle 102. The interior data collection component 120 may be housed within, under, above, and/or on the interior vehicle component 140, for example. The interior data collection component 120 may be in hardwired and/or wireless communication with vehicle computer 200. The interior data collection component 120 may be designed to operate according to predetermined specifications, such as a dedicated short-range communication (DSRC) channel, wireless telephony, Wi-Fi, or other existing or later-developed communications protocols.

The actuator component 130 is configured to mechanically control and/or restrict movement of one or more mechanisms of the interior vehicle component 140 in order to reduce the risk of injury to one or more vehicle passengers, to enable a passenger to safely exit the vehicle, and/or to enable safe extraction of a passenger from the vehicle. The actuator component 130 may use electronic, pneumatic, hydraulic, thermal, and/or magnetic means to mechanically operate the interior vehicle component 140. The actuator component 130 may adjust and/or restrict movement of the entire interior vehicle component 140 or a part, portion, or section of the interior vehicle component 140. In some embodiments, the actuator component 130 may supply additional force to, or reduce the force applied on, an interior vehicle component to enable a human to adjust the physical configuration of an interior vehicle component 140. The actuator component 130 may be configured to receive a command, or a message/signal indicative of a command, from the actuator control module 230, to adjust and/or restrict movement of the interior vehicle component 140 in response the vehicle computer 200 detecting a vehicle accident condition. In some embodiments, the actuator control module 230 generates an analog or digital power signal to control the actuator 130. The actuator component 130 may be configured to mechanically adjust the physical configuration, orientation, and/or position of the interior vehicle component 140.

Examples of adjusting the physical configuration, orientation, or position of the interior vehicle component 140 include, but are not limited to, adjusting the yaw angle, pitch angle, and/or roll angle of the interior vehicle component 140. Other examples of adjusting the physical configuration, orientation, and/or position include, but are not limited to, moving the interior vehicle component 140 in at least one of a forward, backward, upward, downward, clockwise, counterclockwise, or lateral direction relative to the vehicle 102. For example, when the interior vehicle component 140 is a passenger seat, in response to a processor (e.g., the processor 202 of FIG. 1B) detecting the vehicle 102 has been in a head-on collision that has caused the engine of the vehicle 102 to catch fire, the actuator component 130 may move the passenger seat backwards and rotate the passenger seat away from the fire. Conversely, following a vehicle collision or accident, the actuator component may move a passenger seat to a physical configuration that enables a passenger to safely exit the vehicle or to be safely extracted from the vehicle.

In another example in which the processor 202 detects that the vehicle 102 has entered a body of water and is sinking, the interior vehicle component 140 may be a door, window, or roof latch, and the actuator component 130 may adjust the physical configuration of the door, window, or roof latch, to enable a passenger to exit the vehicle. Conversely, without the actuator component 130 adjusting the physical configuration of the door, window, roof latch, or other component of the vehicle, it may be impossible for one individual to exert enough force to open the door or break the glass of a window because of the underwater pressure forces exerted on the vehicle 102.

Examples of the actuator component 130 include, but are not limited to, a motor or other device configured to move a seat, engage/disengage a seatbelt, tighten/loosen a seatbelt, roll up/down a window, open/close a sunroof, lock/unlock a vehicle door, lock/unlock an interior compartment, deploy an airbag, deploy a floatation device, deploy a parachute, deploy a fire extinguishing apparatus and/or substance, deploy a tire traction device and/or substance, and/or operate any other interior vehicle component 140 to improve the safety of a vehicle passenger. The actuator component 130 may be originally installed by a manufacturer of the vehicle 102, or installed as aftermarket modification or addition to the vehicle 102.

In some embodiments, the actuator component 130 may include a Stewart strut system (i.e., a Stewart platform) disposed on a moveable platform with one or more legs of adjustable length. In such embodiments, when the processor 202 detects the vehicle 102 has become stuck in a ditch and the passenger is stuck in a position that puts tremendous strain on his/her body (the vehicle accident condition), for example, the Stewart strut actuator component 130 may lengthen one or more of its legs and/or shorten one or more of its legs to adjust the physical configuration of the interior vehicle component 140 in order to reduce the strain felt by a passenger in the vehicle 102.

The actuator component 130 may be configured to receive a command, message, and/or signal from the actuator control module 230 to prevent the interior vehicle component 140 from being adjusted or moved beyond a predetermined range of physical configurations, conditions, or positions. For example, the actuator control module 230 may transmit a signal to the actuator component 130 corresponding to a range of permissible positions to which the actuator component 130 may move the interior vehicle component 140, thereby restricting the actuator component 130 from moving the interior vehicle component 140 to any position outside that range. In some embodiments, for example, the actuator control module 230 causes the actuator component 130 to prevent passengers from manually adjusting the interior vehicle component 140 (or a component thereof). For example, the actuator component may be a set of electronic latches configured to restrict a vehicle passenger from reclining the back rest of a seating apparatus beyond a certain angle. In some embodiments, restricting movement of the interior vehicle component 140 entails reinforcing and/or strengthening the physical support system of the interior vehicle component 140.

In other embodiments, the actuator component 130 may include a locking mechanism configured to restrict movement of the entire interior vehicle component 140. For example, when the actuator component 130 is a Stewart strut system, movement of one or more of the Stewart strut system's legs may be restricted using a locking mechanism, thereby keeping one or more legs confined to a specific length, to prevent the interior vehicle component 140 from moving in a certain manner.

The interior vehicle component 140 is a physical element, unit, device, and/or apparatus contained or accessible from within the vehicle 102. The interior vehicle component 140 is configured to have its physical configuration adjusted, or its movement restricted, by the actuator component 130 in response to the vehicle computer 200 detecting a vehicle accident condition. The interior vehicle component 140 may have its physical configuration adjusted, or its movement restricted, to improve the safety of, prevent injury to, reduce the risk of injury to, minimize injury to a passenger; enable a passenger to safely exit from the vehicle, assist a third party with safely extracting a passenger from the vehicle; and/or to protect one or more passengers riding in/on the vehicle 102.

For example, in an embodiment in which the vehicle has entered a body of water (the vehicle accident condition) and the interior vehicle component is a window, the window may be adjusted from closed to open in response to the processor 202 detecting the vehicle 102 is sinking, and thus the window is opened to enable a vehicle passenger to exit the vehicle 102 and/or to allow another individual, such as a first responder, to extract the passenger quickly and in a less labor intensive manner.

In another example, after a vehicle 102 has been involved in a collision, the vehicle door (the interior vehicle component 140) may be restricted from being adjusted to an open position because the processor 202 has detected vehicles approaching at a high speed, and opening the door (or allowing the door to be opened manually by a passenger) would expose a passenger to the risk of being hit by an approaching vehicle.

In another example in which the interior vehicle component 140 is a passenger seat, in response to the processor 202 detecting the vehicle 102 has collided with an external object 199, the actuator component 130 may restrict the passenger seat's physical configuration (e.g., lock the seat in place and reinforce its support system) so that the passenger seat is not displaced, and the passenger injured, as a result of additional vehicle movement caused by the collision impact. Further, the processor 202 may detect that the passenger has suffered a back injury as a result of the impact from the collision, and may cause the actuator component 130 to restrict the passenger seat's physical configuration to stabilize the passenger's body and prevent additional injury.

The interior vehicle component 140 may be originally installed by a manufacturer of the vehicle 102, installed as an aftermarket modification or addition to the vehicle 102, or may be an item that happens to be present in the vehicle at a particular time (e.g., because a passenger carried the item onto the vehicle 102). Examples of the interior vehicle component 140 include, but are not limited to, a seating apparatus, computer, mobile device, steering wheel, a mirror, window, a door, a hardtop convertible roof, a soft-top convertible roof, a floor panel, a visor, partition, sunroof, sky roof, user interface, control panel, head rest, arm rest, back rest, storage module, beverage holder, foot rest, bed, seatbelt, airbag, surface, desk, work surface, child seat, and/or other element. In some embodiments, the interior vehicle component 140 may be a component that is accessible from the interior and/or exterior of the vehicle 102, such as a vehicle door or window.

The interior vehicle component 140 may be in a first physical configuration, orientation, or position prior to the vehicle computer 200 detecting a vehicle accident condition. The interior data collection component 120 may collect data corresponding to the first physical configuration of the interior vehicle component 140, before and/or during operation of the vehicle 102, so that the processor 202 has reference data from which to evaluate whether a passenger has sustained an injury and/or whether a passenger is unable to safely exit the vehicle if a vehicle accident condition is detected. The first physical configuration of the interior vehicle component 140 may be set by a manufacturer, the vehicle computer 200 (or a component of the vehicle computer 200), or manually by an end user or passenger. In response to the vehicle computer 200 detecting a vehicle accident condition, the actuator component 130 may adjust/move the interior vehicle component 140 to a second physical configuration in order to prevent injury to a passenger riding in the vehicle 102, to enable the passenger to be able to safely exit the vehicle, and/or to enable the passenger to be safely extracted from the vehicle by a third party. In some embodiments, the interior vehicle component 140 may be configured to restrict the movement of one or more passengers while inside the vehicle 102.

In some embodiments, the physical configuration of the interior vehicle component 140 may not be adjusted or restricted, in response to the processor 202 detecting a vehicle accident condition, for any one or more of various reasons. For example, the processor 202 may have determined that a passenger has not sustained an injury, that the current first physical configuration of the interior vehicle component 140 is already in a physical configuration that sufficiently prevents injury to a passenger riding in the vehicle 102, and/or that the current first physical configuration of the interior vehicle component 140 already enables a passenger to safely exit the vehicle (or be extracted by a third party) following an accident. For example, in embodiments in which the interior vehicle component is a passenger seat, the processor 202 may determine that the vehicle 102 has collided with an external object. However, because the collision occurred at such a low speed and with such a low impact of force, the current physical configuration of the passenger seat may nonetheless be maintained because the processor 202 has determined that the passenger seat is already in the best physical configuration to protect the seated passenger, the vehicle passenger has not suffered an injury, the vehicle 102 has not suffered any physical damage, and/or the current physical configuration of the passenger seat already enables the passenger to safely exit the vehicle.

It should be appreciated that the interior vehicle component may be adjusted to a multitude of physical configurations in response to the processor detecting one or more vehicle accident conditions. In such circumstances, a processor may cause the actuator component to adjust the interior vehicle component from a first physical configuration to a second physical configuration in response to the processor detecting a first vehicle accident condition, and then adjusting the interior vehicle component from a second physical configuration to a third physical configuration. In an example in which the interior vehicle component is a passenger seat, the processor may cause an actuator component to move the passenger seat backwards (the second physical configuration) in response to a vehicle being in a head-on collision with another vehicle (e.g. external object 199). However, the processor may detect that damage to the vehicle and/or a change in location/orientation of the vehicle prevents the passenger from safely exiting the vehicle following the accident, and thus the processor may cause the passenger seat to be moved laterally (the third physical configuration) to allow the passenger to exit the vehicle.

In one embodiment of the system 100, as depicted in FIG. 1A, prior to and/or during operation of the vehicle 102, the interior data collection component 120 collects data indicative of a current/first physical configuration of the interior vehicle component 140, and/or passenger data corresponding to a passenger riding in the vehicle 102. The processor 202 stores the first configuration data in the IVC configuration data storage 234 and stores the passenger data in the passenger profile data storage 238. This data is collected so that the processor 202 has a reference point of pertinent information for assessing whether a passenger riding in the vehicle 102 is at risk of sustaining an injury while the vehicle 102 is operating. Thereafter, the sensor 112 collects sensor data and the sensor data is transmitted to the vehicle computer 200. The vehicle computer 200 receives the sensor data via the transceiver 204, and the processor 202 stores the sensor data in the sensor data storage 212. After the sensor data is collected, received, and stored in the sensor data storage 212, the processor 202 executes a vehicle accident condition detection program, stored in the vehicle accident condition detection program memory 214, which is configured to analyze the sensor data to determine whether a vehicle accident condition exists.

When the processor 202 detects the vehicle accident condition, the processor 202 executes an actuator program stored in the actuator program memory 232 to cause the actuator component 130 to adjust the physical configuration of the interior vehicle component 140 from the first physical configuration to a second physical configuration, stored as IVC physical configuration data in the IVC configuration data storage 234. The actuator component 130 then adjusts the interior vehicle component 140, in response to detecting the vehicle accident condition, to the second physical configuration to protect one or more passengers of the vehicle 102, to enable the one or more passengers to safely exit the vehicle 102, and/or to enable a third party to safely extract the one or more passengers from the vehicle 102.

By way of a non-limiting example to demonstrate this embodiment of the system 100, a sensor (e.g., the sensor 112) coupled to the vehicle 102 collects data (sensor data) representing, for example, the physical condition of the exterior surface of the vehicle 102 and/or a distance between the vehicle 102 and an adjacent vehicle (e.g. external object 199). The sensor transmits this data to a processor 202 (within the vehicle computer 200), and the processor 202 detects, based on this data, whether the vehicle 102 and the adjacent vehicle have collided (the vehicle accident condition). The processor 202 may make this determination by comparing, for example, the physical appearance of the exterior surface of the vehicle 102, detecting a force being exerted on the exterior of the vehicle 102, and/or the distance between the two vehicles. When the processor 202 determines that the vehicle 102 and the adjacent vehicle have collided, the processor 202 causes the actuator component 130 to adjust the physical configuration of a passenger's seat (e.g., the interior vehicle component 140) from its current configuration (the "first" physical configuration) to a second physical configuration in order to minimize the impact felt by a passenger and to protect the passenger from sustaining an injury caused by the collision between the vehicle 102 and the adjacent vehicle.

By way of another non-limiting example to demonstrate this embodiment of the system 100, a sensor (e.g., the sensor 112), coupled to the vehicle 102, collects data (sensor data) representing the exterior physical structure of the vehicle 102. The sensor transmits this data to a processor 202 (within the vehicle computer 200), and the processor 202 detects, based on this data, whether an external object has hit, punctured, broken, dented, and/or otherwise damaged the exterior physical structure (e.g., a bumper, window, windshield, door, trunk, etc.) of the vehicle 102 (the accident condition). When the processor 202 determines that the exterior physical structure of the vehicle 102 has been damaged, thereby indicating a vehicle accident condition, the processor 202 causes the actuator component 130 to adjust the physical configuration of a passenger's seat (e.g., the interior vehicle component 140) from its current configuration (the "first" physical configuration) to a second physical configuration in order to minimize any effects felt by a passenger and to protect the passenger from sustaining an injury resulting from the impact to the vehicle 102. Additionally, in the event that a passenger cannot safely exit the vehicle 102 as a result of the damage to the vehicle 102 (e.g., altering the location/position/orientation of the vehicle such that a passenger cannot open a door, or damaging the door such that it is inoperable), the actuator component 130 may adjust the physical configuration of the passenger seat so that the passenger can safely exit the vehicle.

In an alternative embodiment of the system 100, in response to the processor detecting the vehicle accident condition, the processor 202 executes an actuator program stored in the actuator program memory 232 to cause the actuator component 130 to restrict movement of the interior vehicle component 140 from the first physical configuration to a range of physical configurations, stored as IVC configuration range limit data in the IVC configuration data storage 234. The actuator component 130 then restricts movement of the interior vehicle component 140 to a range of physical configurations in order to improve the safety of/protect one or more passengers of the vehicle 102 after a vehicular accident.

By way of a non-limiting example to demonstrate this embodiment of the system 100, a sensor (e.g., the sensor 112) affixed to the vehicle 102 collects data (sensor data) representing the water level external to a vehicle. The sensor transmits this data to a processor 202 (within the vehicle computer 200), and the processor 202 may detect based on this data, for example, that the vehicle 102 has entered a body of water. In response to this determination, the processor 202 causes the actuator component 130 to restrict the physical configuration of a window (the interior vehicle component 140) from exceeding a specific range of configurations in order to prevent water from filling up the interior of the vehicle. Accordingly, a passenger may be restricted to opening the window, for example, to a set range of positions, but may be unable to roll the window down beyond a specific position in order to prevent water from entering the interior of the vehicle.

In an alternative embodiment of the system 100, in response to the processor detecting the vehicle accident condition, the processor 202 executes an actuator program stored in the actuator program memory 232 to cause the actuator component 130 to restrict movement of the interior vehicle component 140 to its current/first physical configuration. The actuator component 130 then restricts movement of the interior vehicle component 140 in order to improve the safety of/protect one or more passengers of the vehicle 102.

By way of a non-limiting example to demonstrate this embodiment of the system 100, a sensor (e.g., the sensor 112) affixed to the vehicle 102 collects data (sensor data) representing the water level external to a vehicle. The sensor transmits this data to a processor 202 (within the vehicle computer 200), and the processor 202 may detect based on this data, for example, that the vehicle 102 has entered a body of water and is sinking. In response to this determination, the processor 202 causes the actuator component 130 to restrict the physical configuration of a window (the interior vehicle component 140) from being opened, while another potential exit (e.g., a sun roof) is opened/remains open, in order to prevent water from entering the vehicle after the vehicle 102 has started to sink in the body of water.

Figures 2A, 2B, 2C:
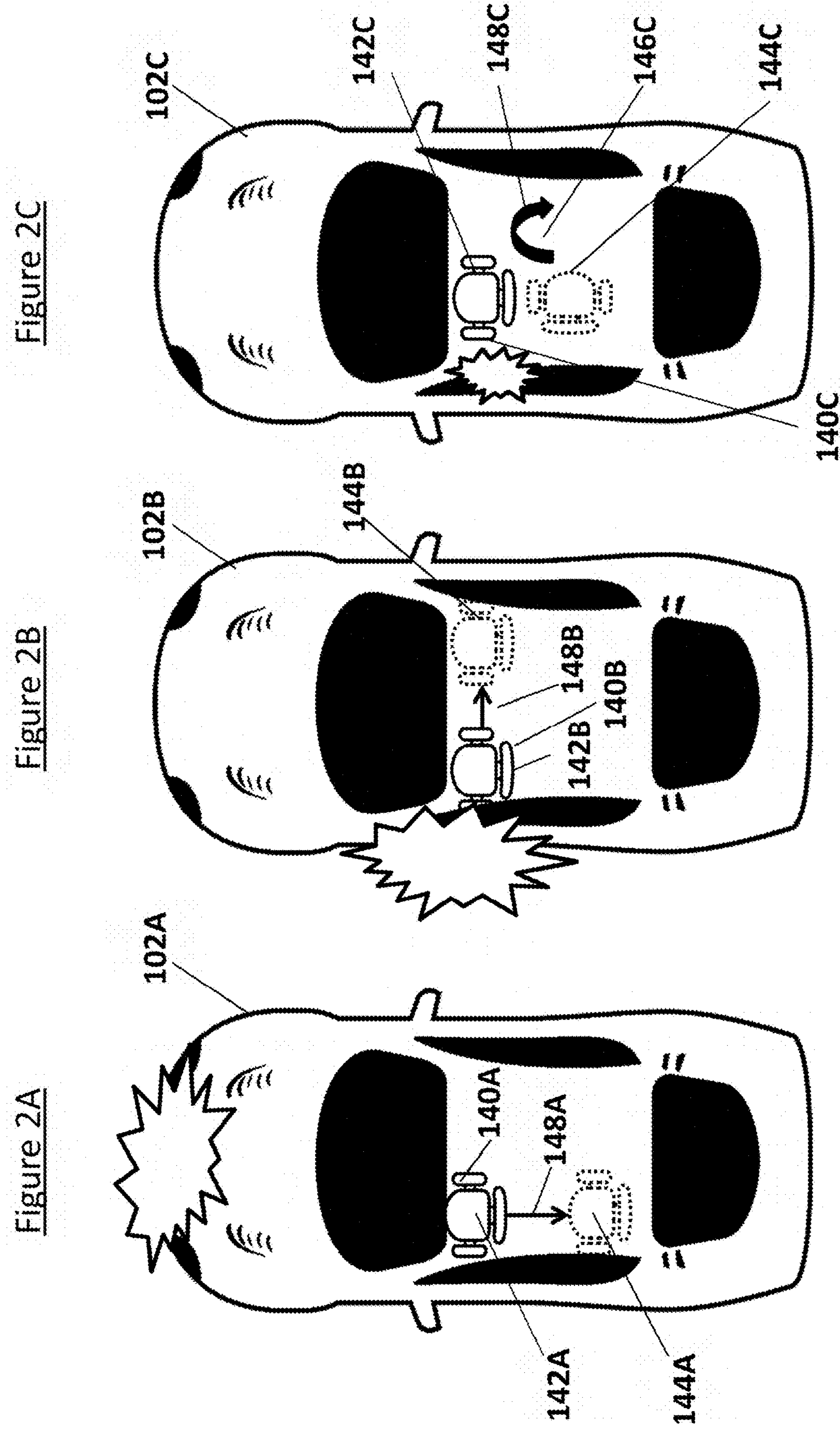
FIG. 2A illustrates a first embodiment in which an interior vehicle component may be adjusted from a first physical configuration to a second physical configuration.
FIG. 2B illustrates a second embodiment in which an interior vehicle component may be adjusted from a first physical configuration to a second physical configuration.
FIG. 2C illustrates a third embodiment in which an interior vehicle component may be adjusted from a first physical configuration to a second physical configuration.

FIG. 2A illustrates a first embodiment in which an interior vehicle component may be adjusted from a first physical configuration to a second physical configuration. As FIG. 2A illustrates, interior vehicle component 140A is disposed within a vehicle 102A in a first physical configuration 142A. In this embodiment, the interior vehicle component 140A is adjusted backwards to a second physical configuration 144A in response to the vehicle computer determining that a vehicle accident condition has been detected. For example, in an embodiment in which the interior vehicle component 140A is a passenger seat in the vehicle 102A, when the processor detects that the vehicle 102A has collided head on with another vehicle, the processor may cause the actuator component to move the passenger seat from a current/initial physical configuration in the front end of the vehicle (the first physical configuration 142A) backwards to a new physical configuration towards the rear portion of the vehicle (the second physical configuration 144A) to protect a passenger and/or to enable the passenger to safely exit the vehicle.

In some embodiments, the interior vehicle component 140A may be restricted to a range of physical configurations 148A, wherein the interior vehicle component 140A is restricted to a physical configuration/position between the first physical configuration 142A and the second physical configuration 144A in response to the processor detecting the vehicle accident condition.

FIG. 2B illustrates a second embodiment in which an interior vehicle component may be adjusted from a first physical configuration to a second physical configuration. As FIG. 2B illustrates, interior vehicle component 140B is disposed within a vehicle 102B in a first physical configuration 142B. In this embodiment, the interior vehicle component 140B is adjusted laterally to the right to a second physical configuration 144B in response to the vehicle computer determining that a vehicle accident condition has been detected. For example, in an embodiment in which the interior vehicle component 140B is a passenger seat in the vehicle 102B, when the processor detects that the vehicle 102B has been hit by another vehicle on the left side of the vehicle, the processor may cause the actuator component to move the passenger seat from a current/initial physical configuration on the left side of the vehicle (the first physical configuration 142B) laterally to a new physical configuration on the right side of the vehicle (the second physical configuration 144B) to protect a passenger and/or to enable the passenger to safely exit the vehicle on the right side of the vehicle.

In some embodiments, the interior vehicle component 140B may be restricted to a range of physical configurations 148B, wherein the interior vehicle component 140B is restricted to a physical configuration/position between the first physical configuration 142B and the second physical configuration 144B. In another example in which the interior vehicle component 140B is a passenger seat, the vehicle 102B may be sinking in a body of water, and the processor may determine that the rear end of vehicle 102B has already become submerged in the body of water. Consequently, the configuration or movement of the passenger seat may be constricted to a physical configuration between a left-side configuration (142B) and a right-side configuration (144B) and the passenger seat may be restricted to only moving laterally along the same line or plane, in order to prevent the passenger from moving backwards and becoming trapped under water.

FIG. 2C illustrates a third embodiment in which an interior vehicle component may be adjusted from a first physical configuration to a second physical configuration. As FIG. 2C illustrates, interior vehicle component 140C is disposed within a vehicle 102C in a first physical configuration 142C. In this embodiment, the interior vehicle component 140C is rotated about a yaw angle 146C in a clockwise direction to a second physical configuration 144C in response to the vehicle computer detecting a vehicle accident condition. For example, in an embodiment in which the interior vehicle component 140C is a passenger seat in the vehicle 102C, when the processor detects that an object has hit the left side of the vehicle 102C, the processor may cause the actuator component to rotate the passenger seat from a current/initial physical configuration facing forward (the first physical configuration 142C) to a new physical configuration facing the right side of the vehicle (the second physical configuration 144C) to protect a passenger and/or to enable the passenger to safely exit the vehicle on the right side of the vehicle.

In some embodiments, the interior vehicle component 140C may be restricted to a range of physical configurations 148C, wherein the interior vehicle component 140C is restricted to a physical configuration between the first physical configuration 142C and the second physical configuration 144C in response to the processor detecting the vehicle accident condition.

Figures 2D, 2E:
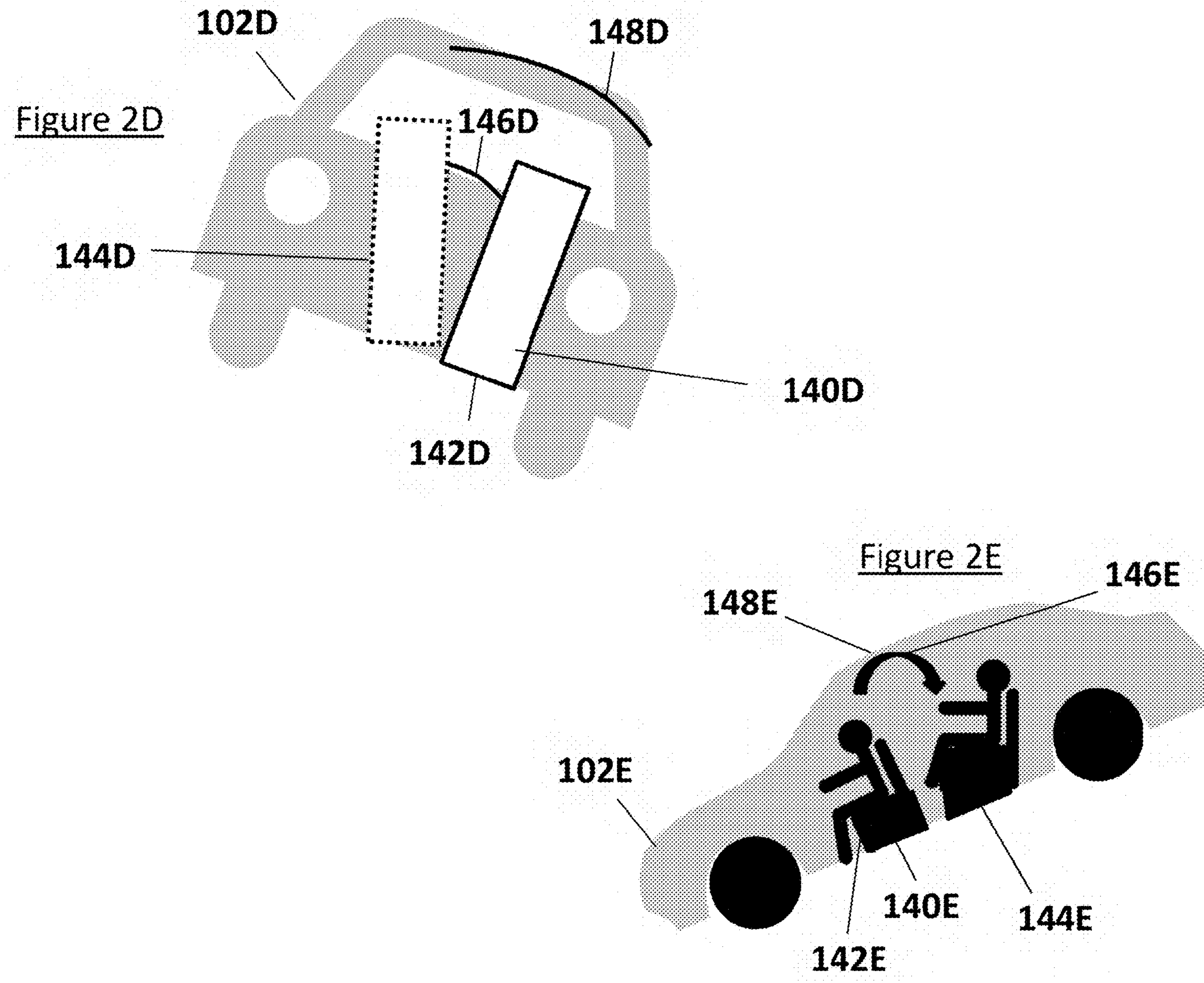
FIG. 2D illustrates a fourth embodiment in which an interior vehicle component may be adjusted from a first physical configuration to a second physical configuration.
FIG. 2E illustrates a fifth embodiment in which an interior vehicle component may be adjusted from a first physical configuration to a second physical configuration.

FIG. 2D illustrates a fourth embodiment in which an interior vehicle component may be adjusted from a first physical configuration to a second physical configuration. As FIG. 2D illustrates, interior vehicle component 140D is disposed within a vehicle 102D in a first physical configuration 142D. In this embodiment, the interior vehicle component 140D is rotated about a roll angle 146D to a second physical configuration 144D in response to the vehicle computer determining that a vehicle accident condition has been detected. For example, in an embodiment in which the interior vehicle component 140D is a passenger seat in the vehicle 102D, when the processor detects the vehicle 102D has jumped a curve and collided with an external object at an angle, the processor may cause the actuator component to tilt the passenger seat from a seemingly titled/angled physical configuration (142D) to a flat/upright physical configuration (144D) to protect a passenger from suffering an injury/discomfort caused by the titled seat and/or to enable the passenger to exit the vehicle in a more safe manner.

In some embodiments, the interior vehicle component 140D may be restricted to a range of physical configurations 148D, wherein the interior vehicle component 140D is restricted to a physical configuration/position between the first physical configuration 142D and the second physical configuration 144D in response to the processor detecting the vehicle accident condition.

FIG. 2E illustrates a fifth embodiment in which an interior vehicle component may be adjusted from a first physical configuration to a second physical configuration. As FIG. 2E illustrates, interior vehicle component 140E is disposed within a vehicle 102E in a first physical configuration 142E. In this embodiment, the interior vehicle component 140E is rotated about a pitch angle 146E to a second physical configuration 144E in response to the vehicle computer determining that a vehicle accident condition has been detected. For example, in an embodiment in which the interior vehicle component 140E is a passenger seat in the vehicle 102E, when the processor detects that the vehicle 102E has crashed into a ditch (the vehicle accident condition), the processor may cause the actuator component to adjust the passenger seat from an upright configuration (142E) backwards to a tilted/angled physical configuration (144E) to protect a passenger from suffering an injury/discomfort caused by the position of the vehicle 102E and/or to enable the passenger to exit the vehicle in a safer manner.

In some embodiments, the interior vehicle component 140E may be restricted to a range of physical configurations 148E, wherein the interior vehicle component 140E is restricted to a physical configuration/position between the first physical configuration 142E and the second physical configuration 144E. In another example in which the interior vehicle component 140E is a passenger seat in the vehicle 102E, when the processor detects the vehicle 102E has crashed and is in a downwards sloping position (the vehicle accident condition), the processor may cause the actuator component to restrict the configuration and/or movement of the passenger seat to a range between the first physical configuration 142E and the second physical configuration 144E in order to protect the passenger from falling out of his/her seat and suffering an injury.

Figure 2F:
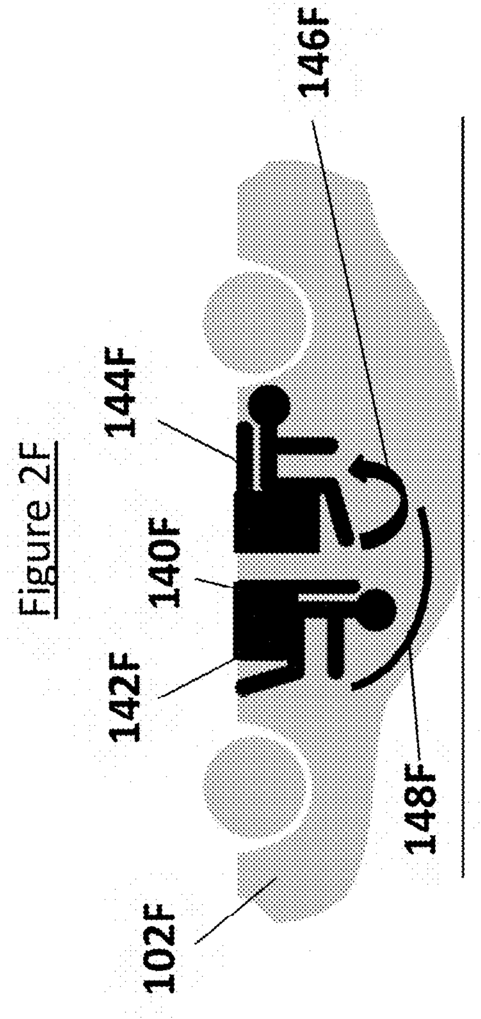
FIG. 2F illustrates a sixth embodiment in which an interior vehicle component may be adjusted from a first physical configuration to a second physical configuration.

FIG. 2F illustrates a sixth embodiment in which an interior vehicle component may be adjusted from a first physical configuration to a second physical configuration. As FIG. 2F illustrates, interior vehicle component 140F is disposed within a vehicle 102F in a first physical configuration 142F. In this embodiment, the interior vehicle component 140F is rotated about a pitch angle 146F to a second physical configuration 144F in response to the vehicle computer determining that a vehicle accident condition has been detected. For example, in an embodiment in which the interior vehicle component 140F is a passenger seat in the vehicle 102F, when the processor detects that the vehicle 102F has been in a rollover accident (the vehicle accident condition), the processor may cause the actuator component to adjust the passenger seat from a first physical configuration (142F) backwards to a second physical configuration (144F) to reduce the force felt by a passenger being upside down as a result of a rollover accident. Additionally, adjusting the physical configuration of the passenger seat in this manner improves the passenger's ability to safely exit the vehicle, or to be extracted from the vehicle by a third party, by protecting the passenger from falling on his/her head, and thus sustaining an injury.

In some embodiments, the interior vehicle component 140F may be restricted to a range of physical configurations 148F, wherein the interior vehicle component 140F is restricted to a physical configuration/position between the first physical configuration 142F and the second physical configuration 144F. In another example in which the interior vehicle component 140F is a passenger seat in the vehicle 102F, when the processor detects that the vehicle 102F has been in a rollover accident (the vehicle accident condition), the processor may cause the actuator component to restrict the configuration and/or movement of the passenger seat to a range between the first physical configuration 142F and the second physical configuration 144F in order to protect the passenger from sustaining an injury trying to exit the passenger seat and/or vehicle.

Figure 2G:
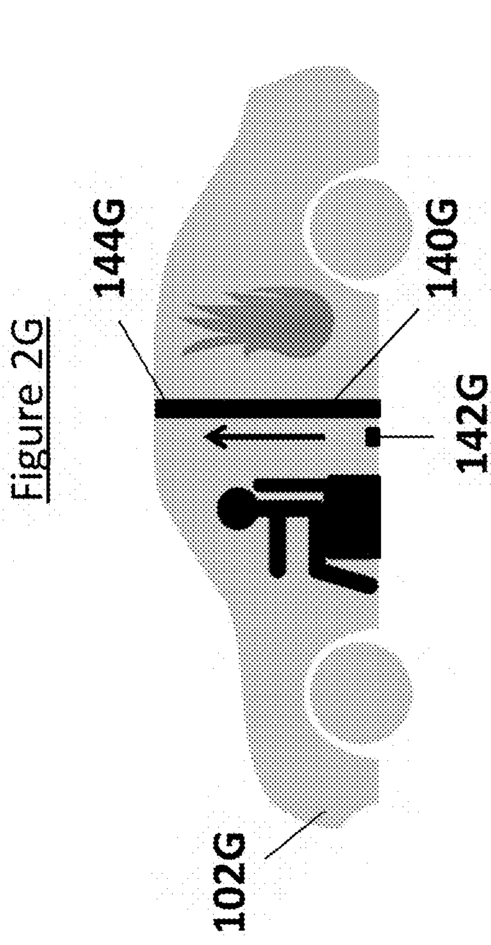
FIG. 2G illustrates a seventh embodiment in which an interior vehicle component may be adjusted from a first physical configuration to a second physical configuration.

FIG. 2G illustrates a seventh embodiment in which an interior vehicle component may be adjusted from a first physical configuration to a second physical configuration. As FIG. 2G illustrates, interior vehicle component 140G is disposed within a vehicle 102G in a first physical configuration 142G. In this embodiment, the interior vehicle component 140G is adjusted upwards to a second physical configuration 144G in response to the vehicle computer determining that a vehicle accident condition has been detected. For example, in an embodiment in which the interior vehicle component 140G is a partition, when the processor detects a fire in the rear of the vehicle (the vehicle accident condition), the processor may cause the actuator component to adjust the partition upwards from a first physical configuration (142G) to a second physical configuration (144G) in order to contain the fire and protect the passenger seated in the front of the vehicle. In another example when the processor determines that the rear end of the vehicle 102G has entered a body of water and/or may become submerged within the body of water, the processor may cause the actuator component to move the partition upwards to prevent the passenger from getting wet, trapped underwater, and/or potentially drowning.

Figure 2H:
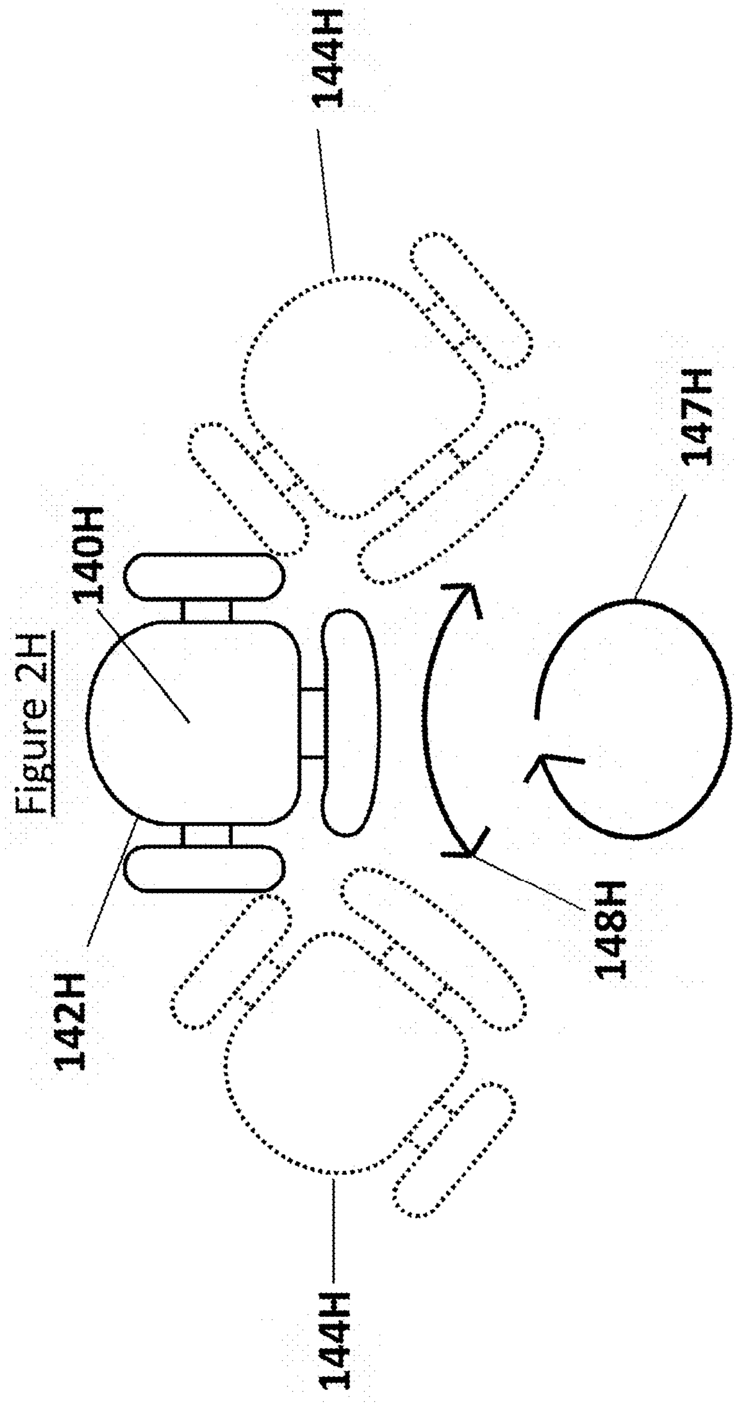
FIG. 2H illustrates an embodiment in which movement of an interior vehicle component may be restricted.

FIG. 2H illustrates an embodiment in which movement of an interior vehicle component may be restricted. As FIG. 2H illustrates, interior vehicle component 140H has a full range of physical configurations 147H. In some embodiments, when the processor detects a vehicle accident condition, movement of the interior vehicle component 140H may be restricted to a range of physical configurations 148H, wherein the interior vehicle component 140H is restricted to a physical configuration/position between a first physical configuration 142H and the second physical configuration 144H.

Figure 2I:
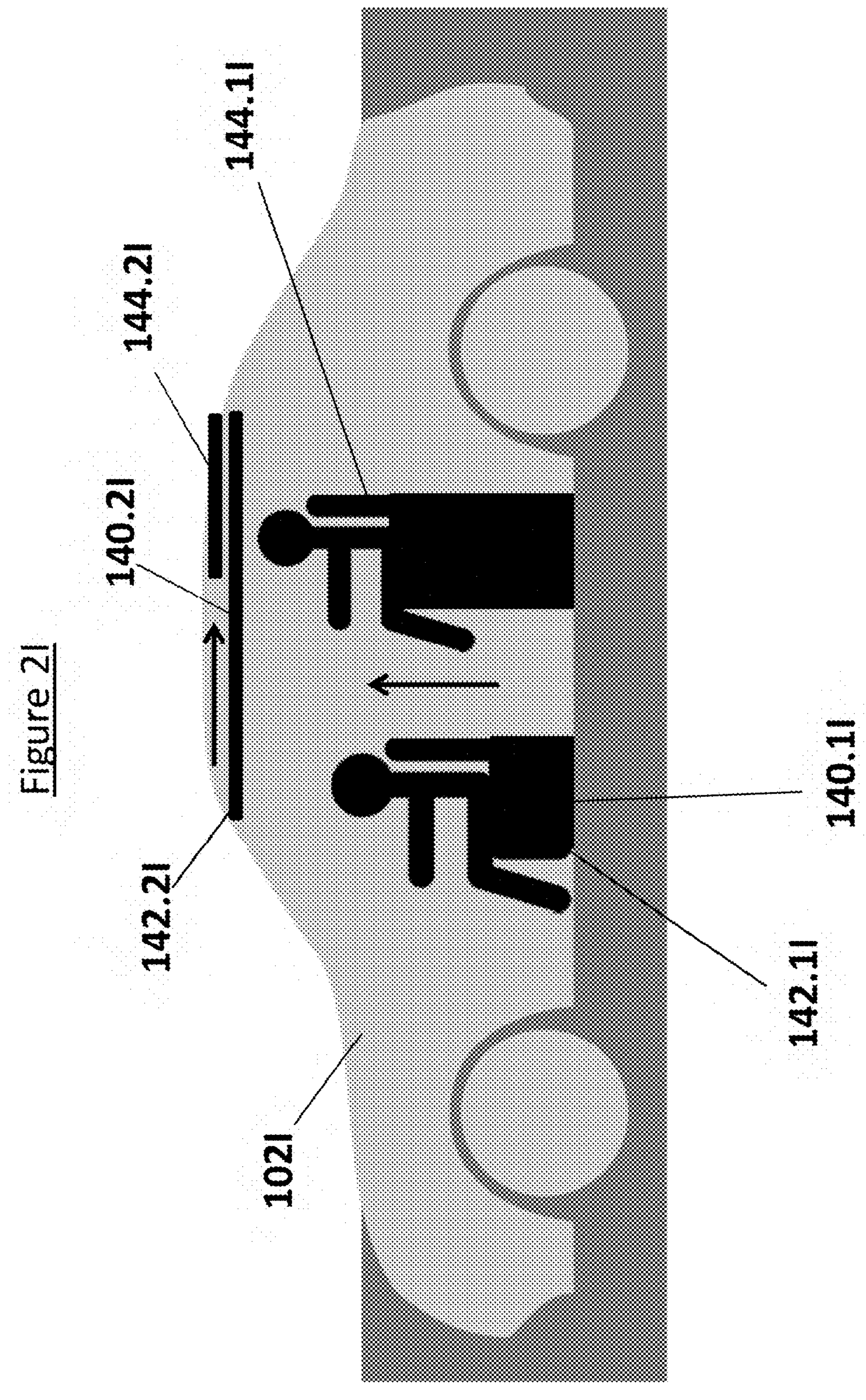
FIG. 2I illustrates an embodiment in which one or more interior vehicle components may be adjusted from a first physical configuration to a second physical configuration.

FIG. 2I illustrates an embodiment in which one or more interior vehicle components may be adjusted from a first physical configuration to a second physical configuration. As FIG. 2I illustrates, vehicle 102I includes a first interior vehicle component 140.1I and a second interior vehicle component 140.2I. The first interior vehicle component 140.1I is in a first configuration 142.1I and the second interior vehicle component 140.2I is in a first configuration 142.2I. In this embodiment, the first interior vehicle component 140.1I is configured to be adjusted upwards to a second physical configuration 144.1I, and the second interior vehicle component 140.2I is configured to be adjusted laterally and/or forwards/backwards to a second physical configuration 144.2I, in response to the vehicle computer detecting a vehicle accident condition. In some embodiments the physical configuration of just one of the interior vehicle components may be adjusted, whereas in other embodiments the physical configuration of both of the interior vehicle components may be adjusted.

For example, in an embodiment in which the first interior vehicle component 140.1I is a passenger seat and the second interior vehicle component 140.2I is a sunroof, when the processor detects the vehicle 102I has become submerged in a body of water (the vehicle accident condition), the processor may cause a first actuator component to adjust the passenger seat upwards to a higher physical configuration (144.1I) to prevent the passenger from getting wet, trapped under water, drowning, and/or to aid the passenger in exiting the vehicle 102I. Additionally, the processor may cause a second actuator component to adjust the physical configuration of the sunroof from a closed physical configuration (142.2I) to an open position (144.2I) to enable the passenger to exit the vehicle 102I.

In some embodiments, the interior vehicle component 140.1I may be restricted to a range of physical configurations. In an example in which the interior vehicle component 140.1I is a passenger seat and the vehicle 102.1I is a convertible automobile being operated with the top down, the processor may detect low hanging trees, low clearance viaducts, or other vertical obstructions overhanging a road (the vehicle accident condition) on which the vehicle 102I is traveling. Accordingly, the processor may cause a first actuator component to restrict the configuration and/or movement of the passenger seat to a range between the first physical configuration 142.1I and the second physical configuration 144.1I to protect the passenger from hitting his/her head on an overhanging obstruction.

In some embodiments, In some embodiments, the interior vehicle component 140.2I may be restricted to a range of physical configurations. In an example in which the interior vehicle component 140.2I is a sunroof, the processor may detect the vehicle has been hit by falling debris (the vehicle accident condition). Accordingly, the processor may cause an actuator component to restrict the configuration and/or movement of the sunroof between the first physical configuration 142.2I and the second physical configuration 144.2I to protect the passenger from being struck by the falling debris.

Figure 2J:
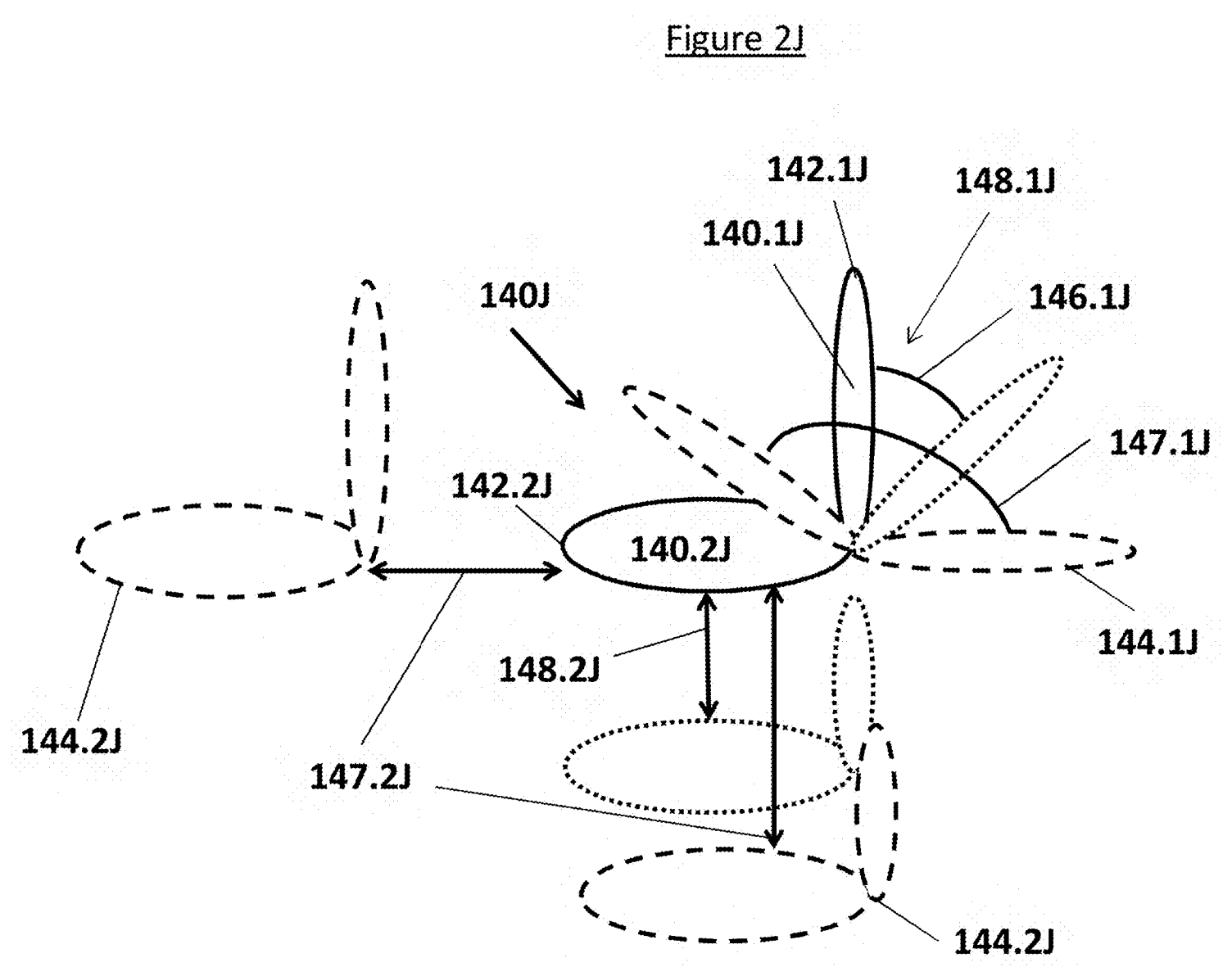

FIG. 2J illustrates an embodiment in which one or more components of an interior vehicle component may be adjusted from a first physical configuration to a second physical configuration. As FIG. 2J illustrates, interior vehicle component 140J includes a first component 140.1J and a second component 140.2J. The first component 140.1J is in a first configuration 142.1J and the second component 140.2J is in a first configuration 142.1J. In this embodiment, the first component 140.1J is configured to be adjusted about a pitch angle 146.1J to a second physical configuration 144.1J, and the second component 140.2J is configured to be adjusted laterally and/or forwards/backwards to a second physical configuration 144.2J, in response to the vehicle computer determining that a vehicle accident condition has been detected. The first component 140.1J is configured to be adjusted to a full range of physical configurations 147.1J. The second component 140.2J is configured to be adjusted to a full range of physical configurations 147.2J. For example, the interior vehicle component 140J may be a passenger seat with a top component (140.1J), configured to support the upper body of a passenger (e.g. a back support), and a bottom component (140.2J), configured to support the lower body of a passenger (e.g. a chair, stool, seat, etc.). The passenger seat may be configured to recline up/down by adjusting the physical configuration of the top component 140.1J, thereby creating a full range of potential positions (147.1J) from seated upright to laying down. The passenger seat may be configured to move forwards, backwards, and laterally within a two-dimensional plane by adjusting the physical configuration of the bottom component 140.2J, thereby enabling a passenger to be seated in a variety of positions throughout the vehicle (147.2J) (e.g. front, back, left, middle, etc.).

In such an embodiment in which the interior vehicle component 140J is a passenger seat, when the processor detects that an approaching vehicle has rear-end collided with the vehicle in which the passenger seat 140J is contained, the processor may cause the actuator component to move bottom component (140.2J) of the passenger seat from a current/initial physical configuration (142.2J), in the back end of the vehicle, forwards to a new physical configuration (144.2J), towards the front portion of the vehicle, to protect the passenger and/or to enable to the passenger to safely exit the vehicle. Additionally, the processor may simultaneously cause the actuator component to adjust the top component (140.1J) from an upright configuration (142.1J) to a second tilted/angled physical configuration (144.1J).

However, in some embodiments, the first component 140.1J may be restricted to a range of physical configurations 148.1J, wherein the first component 140.1J is restricted to a physical configuration/position between the first physical configuration 142.1J and the second physical configuration 144.1J. Similarly, in some embodiments, the second component 140.2J may be restricted to a range of physical configurations 148.2J, wherein the second component 140.2J is restricted to a physical configuration/position between the first physical configuration 142.2J and the second physical configuration 144.2J. In another example in which the interior vehicle component 140J is a passenger seat, the top component 140.1J may be confined to allowing a passenger to recline the passenger seat to a range of physical configurations 148.1J that are between physical configuration 142.1J and physical configuration 144.1J. Further the passenger seat may be confined to moving laterally, via the bottom component, within a range of physical configurations 148.2J that are between physical configuration 142.2J and physical configuration 144.2J.

Figure 2K:
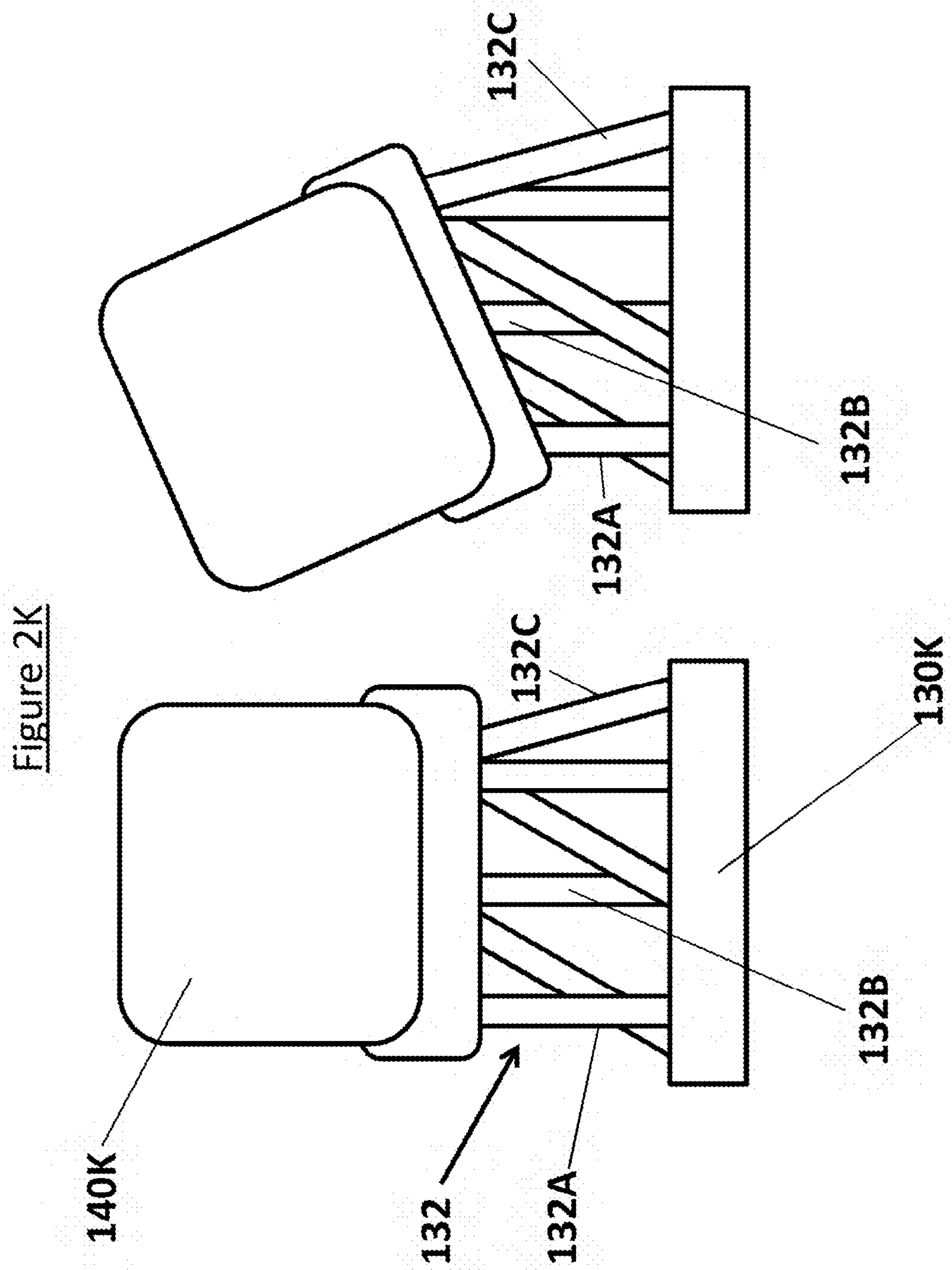
FIG. 2K illustrates an embodiment in which an interior vehicle component may be adjusted using a Stewart strut system.

FIG. 2K illustrates an embodiment in which the configuration of an interior vehicle component may be adjusted using a Stewart strut system (i.e., a Stewart platform). In FIG. 2K, actuator component 130K is a Stewart strut system that controls movement of interior vehicle component 140K using one or more struts 132. The physical configuration of the interior vehicle component 140K is adjusted by extending and/or shortening the length of the struts 132 in response to a vehicle computer (e.g., vehicle computer 200) determining that a vehicle accident condition has been detected. For example, in an embodiment in which the interior vehicle component 140K is a passenger seat, the Stewart strut system may adjust the lengths of one or more of its legs (e.g., 132A, 132B, 132C, etc.) to adjust the physical configuration of the passenger seat. Thus, to tilt the passenger seat to the left (e.g., adjusting the roll angle of the passenger seat), strut 132A may be shortened, while strut 132C is lengthen and strut 132B remains the same length.

In some embodiments, one or more of the struts 132 of the Stewart strut system may be restricted to a static length (e.g., by the actuator control module 230) to prevent manual adjustment of the physical configuration of the interior vehicle component 140K. In another example in which the interior vehicle component 140K is a passenger seat, to restrict movement of the passenger seat and keep it in a specific physical configuration, struts 132A, 132B, 132C, etc. may be locked in place by a locking mechanism to prevent adjusting the length of struts 132.

Figure 3:
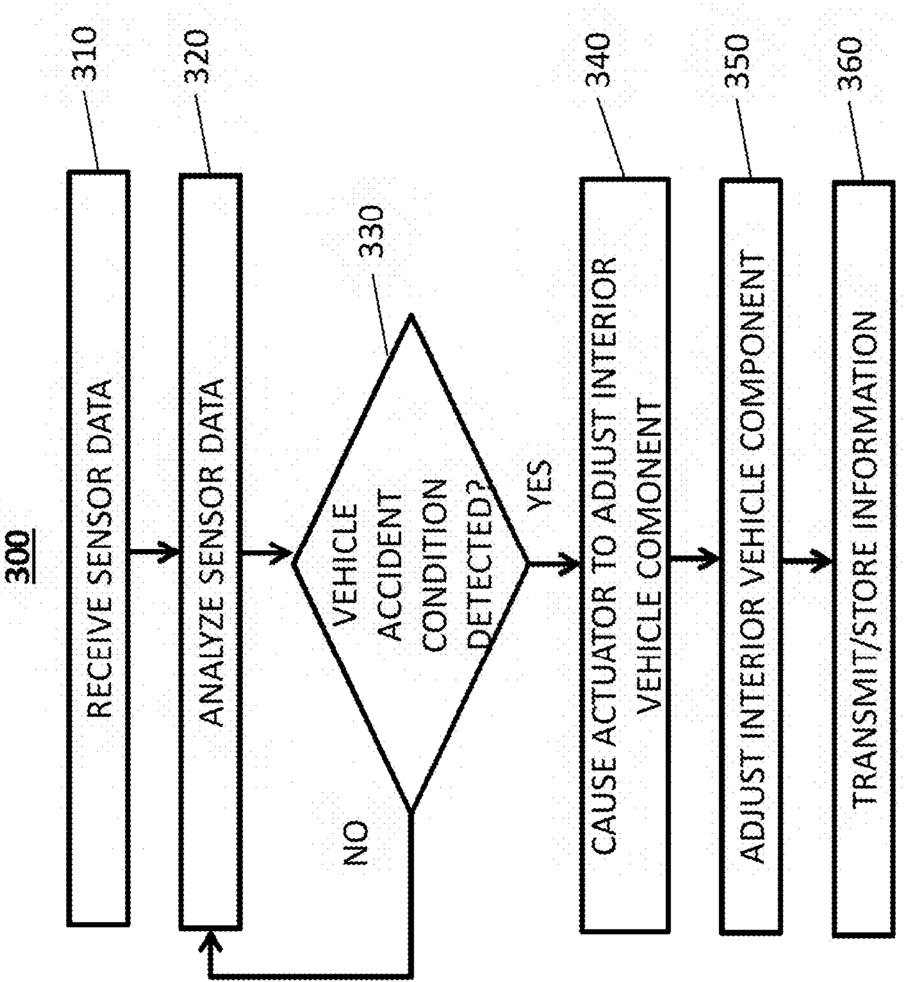
FIG. 3 illustrates a method for adjusting the physical configuration of an interior vehicle component of a vehicle in response to a processor detecting a vehicle accident condition.

FIG. 3 illustrates a method 300 in which the physical configuration of the interior vehicle component of a vehicle (e.g., the interior vehicle component 140 of the vehicle 102 in FIG. 1A) is adjusted in response to a processor (e.g., the processor 202 of FIG. 1B) detecting a vehicle accident condition. In some embodiments, the method 300 may be implemented by the system 100, for example, as described above in connection with FIGS. 1A and 1B. Accordingly, the method 300 may be partially or completely implemented on a vehicle computer (e.g., the vehicle computer 200 of FIG. 1B).

At step 310, sensor data, indicative of a state of the vehicle 102, an action of the vehicle 102, an internal environment of the vehicle 102, and/or an external environment of the vehicle 102 is received. Sensor data may be collected, generated, and/or received using one or more sensors (e.g., the sensor 112 of FIG. 1A), and/or one or more other components (e.g., a transceiver) coupled to/with the sensor(s). In some embodiments, some or all of the sensor data may be received, via a sensor interface, from a third party device, machine, server, network, and/or database. Once collected, the sensor data may be stored locally within the vehicle, for example in the sensor data storage 212 of the vehicle computer 200, and/or transmitted remotely to a third party device, machine, server, network, and/or database.

Next, at step 320, the sensor data is analyzed (e.g., by the processor 202 of the vehicle computer 200 of FIG. 1B). In some embodiments, the sensor data is analyzed in real-time to determine whether a vehicle accident condition exists that may be hazardous to the operation of the vehicle and/or passenger's safety. In some embodiments, the sensor data may also (or instead) be analyzed after a vehicle accident condition has been detected to determine whether the vehicle accident condition prevents a vehicle passenger from being able to safely and/or easily exit the vehicle. In one embodiment, the sensor data may be analyzed by comparing acquired sensor data with data corresponding to current driving environment conditions, past driving environment conditions, previously collected sensor data, and/or sensor data stored in a third-party database. Examples of current driving environment conditions may include objects currently adjacent to the vehicle, current traffic conditions, current road conditions, current weather conditions, and/or any other data about the current state of the driving environment of the vehicle. Past driving environment conditions may include past traffic conditions, past road conditions, past weather conditions, and/or any other data about a previous state or states of the driving environment external to the vehicle. Past driving environment conditions may also include data corresponding to conditions similar to the current driving conditions, data corresponding to conditions in the same or similar locations, and/or data corresponding to past behavior/actions of the same or similar type of vehicle, driver, pedestrian, and/or animal adjacent to the vehicle. Previously collected sensor data may correspond to past behavior, outputs, and/or actions of the vehicle and/or one of its operators; a past physical condition of the vehicle, a subsystem of the vehicle, and/or a component of the vehicle; and/or any other internal or external condition relating to the vehicle.

Sensor data may also be analyzed to determine when (e.g., a time of day, time of year, etc.) and/or under what conditions a vehicle is at an elevated risk of exposure to a vehicle accident condition. Certain roads, or sections of roads, may be more problematic during rush hour, at night, during winter months, or when it is raining. The sensor data may be analyzed to determine whether certain roads and/or intersections are prone to certain types of hazards (e.g., wildlife, roads seldom sprinkled with salt to prevent icing over, potholes, sharp turns, narrow roads, etc.). For example, following a collision, a processor may determine that a passenger cannot safely exit a vehicle because the vehicle has crashed at night time in an area inhabited by coyotes at night, and it is subzero temperatures outside the vehicle. Therefore, allowing the passenger to exit the vehicle may expose the vehicle passenger to potentially more dangerous conditions than if the passenger remained inside the vehicle.

In another example, in furtherance of analyzing the sensor data, the processor may compare the sensor data with previously collected sensor data to detect changes that may be indicative of a vehicle accident condition. For example, to detect a vehicle accident condition of physical damage to the vehicle, the processor may compare sensor data corresponding to the current physical condition of the vehicle (e.g. low tire pressure, bumper damage, a cracked window, etc.) with previously collected sensor data corresponding to a previous physical condition of the vehicle (e.g., normal tire pressure, no bumper damage, intact window, etc.) in order to detect a change in the physical condition of the vehicle.

After analyzing the sensor data, at step 330, a vehicle accident condition detection program is executed to detect whether a vehicle accident condition exists based on the sensor data, such as damage to the vehicle that prevents the vehicle from being operated and/or prevents a passenger from safely exiting the vehicle. The vehicle accident condition detection program may be stored in a program memory (e.g., the vehicle accident condition detection program memory 214). The existence of a vehicle accident condition may be determined by comparing the sensor data with a maximum or minimum threshold, and/or other criteria. In some embodiments, the criteria/threshold may be stored in a data storage unit (e.g., the vehicle accident condition criteria data storage 216 of FIG. 1B). In a simple example where the criteria includes only a threshold, to detect the external driving condition, the sensor data, or a value corresponding to the sensor data, may need to be equal to, less than, or greater than the threshold, for example. These thresholds and/or other criteria may apply directly to the sensor data, or may apply to a more advanced sensor data analysis.

For example, if the vehicle accident condition is a submerged vehicle, sensor data corresponding to water levels outside the vehicle, pressure levels applied to the exterior of the vehicle, and/or a vehicle subsystem failure may be analyzed to detect whether the vehicle has entered a body of water and is sinking. In such an embodiment, the threshold for detecting a submerged vehicle may be a water level exterior to the vehicle exceeding 3 feet, a pressure level on a vehicle door that prevents a passenger from opening the door, and/or engine failure due to water damage. Consequently, when the analysis of the sensor data reveals that the water level outside the vehicle is 4 feet, a vehicle door cannot be opened, and/or the engine is inoperable, the processor detects that the vehicle is submerged (thereby detecting the existence of the vehicle accident condition). However, a submerged/sinking vehicle may not be detected until the water level outside the vehicle exceeds 3 feet. In this way, until the vehicle accident condition is detected, unnecessarily adjusting the physical configuration of the interior vehicle component may be avoided.

Further, depending on other relevant conditions, different threshold values (i.e. larger or smaller) may be used to detect a vehicle accident condition. For example, in detecting whether the vehicle has become submerged (the vehicle accident condition), the water level external to the vehicle, the location of the vehicle, weather conditions, and terrain conditions may be taken into account in determining a threshold value. In such an embodiment, when the vehicle is driving in rainy weather on a highway not near any bodies of water, the threshold indicative of a submerged vehicle may increase, for example, from a water level external to the vehicle of "2 feet or greater" to "4.5 feet or greater." Therefore, in this example, a higher threshold value would be used to prevent falsely detecting that the vehicle is submerged, when in actuality the vehicle may just be temporarily traveling on a road experiencing mild flooding from excess rain. Conversely when the vehicle is driving very close to a lake on a sunny day, the threshold indicative of a submerged vehicle may decrease, for example, from a water level external to the vehicle of "3 feet or greater" to "1.5 feet or greater." Therefore, in this example, a lower threshold value would be used to avoid failing to detect the vehicle is or will be submerged.

Alternatively, in another embodiment, the sensor data may be used to calculate a value associated with a vehicle accident condition. In such an embodiment, the vehicle accident condition may be detected when the calculated value exceeds a predetermined value, indicative of a vehicle accident condition. The calculated value may reflect, for example, a vehicular accident or an injury to a passenger traveling in the vehicle.

While some embodiments of the method 300 have been discussed using individual thresholds to detect a vehicle accident condition, it should be appreciated that detection of a vehicle accident condition may entail the use of multiple criteria and/or thresholds, and/or machine learning (as discussed further below). Further, an embodiment using more than one criterion/threshold may not require that every criterion/threshold be met/exceeded to determine a driving condition exists. For example, in one embodiment, sensor data may be analyzed to determine whether the vehicle has been in a collision. Data related to criteria such as the distance between the vehicle and external objects, the speed of the vehicle, the physical condition of the vehicle, the existence of smoke and/or fire, and/or any other relevant criteria, may be analyzed to detect whether the vehicle has been in a collision. While the distance between the vehicle and an external object may have not exceeded a threshold indicative of a collision, the vehicle may have still been involved in an accident because the sensor data indicates a rapid decrease in speed, a change in the physical condition of the vehicle (e.g., a damaged grill), and the existence of smoke/fire, thereby indicating some sort of vehicle-related accident.

When the vehicle accident condition is not detected, the method returns to step 310 and repeats the method 300 as described above (e.g., on a periodic basis). However, when the processor detects the vehicle accident condition, the method proceeds to step 340.

At step 340, in response to detecting the vehicle accident condition, an actuator program, stored in an actuator program memory (e.g., the actuator program memory 232 of FIG. 1B), is executed to cause an actuator component (e.g., the actuator component 130 of FIG. 1A) to adjust the physical configuration of the interior vehicle component (e.g., the interior vehicle component 140 of FIG. 1A). The actuator component causes the interior vehicle component to be adjusted to a second physical configuration. The second physical configuration may correspond to data stored in a data storage unit (e.g., the IVC configuration data storage 234 of FIG. 1B).

In some embodiments, adjusting the physical configuration of the interior vehicle component from a first physical configuration to the second physical configuration is intended to protect to a passenger riding in the vehicle, enable a passenger to safely exit the vehicle, and/or enable a passenger to be easily extracted from the vehicle. For example, when the vehicle accident condition of a vehicle engine fire is detected, and the interior vehicle is a passenger seat, a safer physical configuration of the passenger seat may be determined based on a passenger's proximity to the fire, damage (or expected damage) to the vehicle, and/or the expected path of the fire. Accordingly, the physical configuration of the passenger seat may be adjusted to a position (e.g., backwards away from the engine of the vehicle) that protects the passenger from the fire and/or that enables the passenger to exit the vehicle more easily and/or safely. Similarly, for example, a second interior vehicle component, such as a partition, may be engaged to protect a passenger from the fire, prevent smoke inhalation, and to contain the fire from spreading.

In some embodiments, the adjusting the physical configuration of the interior vehicle component from a first physical configuration to the second physical configuration is intended to enable a passenger to safely exit the vehicle. For example, following a collision, the door closest to a passenger seat (the interior vehicle component 140) may be damaged and/or obstructed (the vehicle accident condition), thereby preventing a passenger from safely exiting the vehicle. In response to detecting that the passenger cannot exit the vehicle, the processor may cause the actuator component to adjust the physical configuration of the passenger seat to a different position within the vehicle that is closer to another door of the vehicle, that is undamaged and unobstructed, so that the passenger can safely exit the vehicle.

In some embodiments, adjusting the physical configuration of the interior vehicle component from a first physical configuration to the second physical configuration is intended to aid an emergency responder in extracting a passenger from the vehicle. For example, following a collision in which the front portion of a vehicle has entered a ditch (the vehicle accident condition), an injured passenger may be seated towards the front of the vehicle in a passenger seat (the interior vehicle 140) and unable to exit the vehicle due to injury, the position of the car in the ditch, and/or the inoperability of the closest door. In response to detecting that the passenger is injured and cannot exit the vehicle, the actuator component may adjust the physical configuration of the passenger seat backwards to a second position that is more readily accessible by a first responder so that the injured passenger can be extracted from the vehicle faster and with less effort than had the passenger seat remained in the first position. Additionally, information pertaining to the status of the vehicle, the vehicle accident condition, the vehicle passenger, and/or pertaining to timing and/or nature of the reconfiguration of the interior vehicle component, may be forwarded to a third party, such as an emergency responder.

It should be appreciated that adjusting the physical configuration of the interior vehicle component may not occur immediately after the vehicle accident condition is detected, and that there may be a lapse in time and/or a delay between when the vehicle accident condition is detected and the physical configuration of the interior vehicle component is adjusted. A variety of factors may be taken into account by the processor in determining when to cause the actuator component to adjust the physical configuration. For example, when the vehicle accident condition is a rollover accident caused by a collision and the interior vehicle component is a passenger seat, the collision may be detected, by the processor, the instant the vehicle and an adjacent object first make physical contact. However, the physical configuration of passenger seat may not be adjusted until several minutes later, after the vehicle has rolled over and come to a stop. Additionally, the physical configuration of the interior vehicle component may not be adjusted until it is safe for a passenger to exit the vehicle. For example, following the detection of a collision (the vehicle accident condition) on a busy highway, there may be a delay in adjusting the physical configuration of a passenger seat (the interior vehicle component) because the existence of oncoming traffic makes it unsafe for a passenger to exit the vehicle. Accordingly, the physical configuration of the passenger seat may not be adjusted until there are no longer any vehicles approaching, and therefore it is safe for a passenger to exit the vehicle.

In some embodiments, passenger data, collected by an interior data collection component (e.g., the interior data collection component 120 of FIG. 1A) and stored in a data storage (e.g., the passenger profile data storage 238 of FIG. 1B), may also be used to determine and/or affect the second physical configuration of the interior vehicle component. For example, if a passenger is pregnant, this information may be factored into determining how/where to cause the actuator component to adjust the interior vehicle component because certain movements (e.g., rapid or sharp movements) and/or configurations (e.g., a configuration that puts pressure on the passenger's stomach) may be detrimental to the pregnant passenger and/or her child.

Similarly, for example, if a passenger has a back injury/condition, moving the interior vehicle component to a certain configuration may cause the passenger discomfort and/or may further aggravate the condition. Therefore, this passenger information may be considered when determining how to adjust the interior vehicle component.

After the actuator program has been executed to determine the second physical configuration of the interior vehicle component, then at step 350, the physical configuration of the interior vehicle component may be adjusted from the first physical configuration to the second physical configuration.

Some embodiments of the method 300 may include step 360, at which information received, generated, calculated, detected, and/or determined during the method 300 may be stored for future use. Stored information may include, but is not limited to, the sensor data collected at step 310, the vehicle accident condition detected at step 330, and/or the second physical configuration determined at step 340. Storing this information for future use may be used to improve the accuracy and speed of analyzing sensor data, detecting a vehicle accident condition, training machine learning models which may be used for detecting the vehicle accident condition, determining an interior vehicle component physical configuration, and/or adjusting the interior vehicle component. The recorded information may be stored locally in the vehicle computer and/or may be transmitted to a third party machine (e.g., if a driver has expressly agreed to participate in a program involving data collection/sharing).

In some embodiments, the third party device, machine, server, network, and/or database may be associated with or operated by or on behalf of an insurance provider (e.g., if a driver has expressly agreed to participate in a program involving data collection/sharing), an emergency services provider (e.g., police department, fire department, paramedics, hospital, healthcare provider, towing services), city/municipality department, and/or a family member of a passenger of the vehicle. The third party device, machine, server, network, and/or database may be configured to receive, collect, and/or analyze sensor data and/or other data in accordance with any of the methods described herein. Sensor data may be received, either directly or through an intermediate network, from other vehicles traveling on the same road as the vehicle and/or an infrastructure component along the road. For example, emergency service providers may receive sensor data informing them of the location of a vehicular accident, the severity of the vehicular accident, and/or the type/extent of damage/injuries sustained during the vehicular accident. In turn, this may enable more expedited and thorough emergency response services, such as extracting a passenger from the vehicle and providing medical care. In some embodiments, sensor data and/or recorded information may be used for generating, adjusting, evaluating, investigating, analyzing, or prospecting insurance coverage, parameters of the insurance policy (e.g., a deductible), a premium, a rate, a discount, and/or a reward for the specific driver, passenger, or the insured individual.

Figure 4:
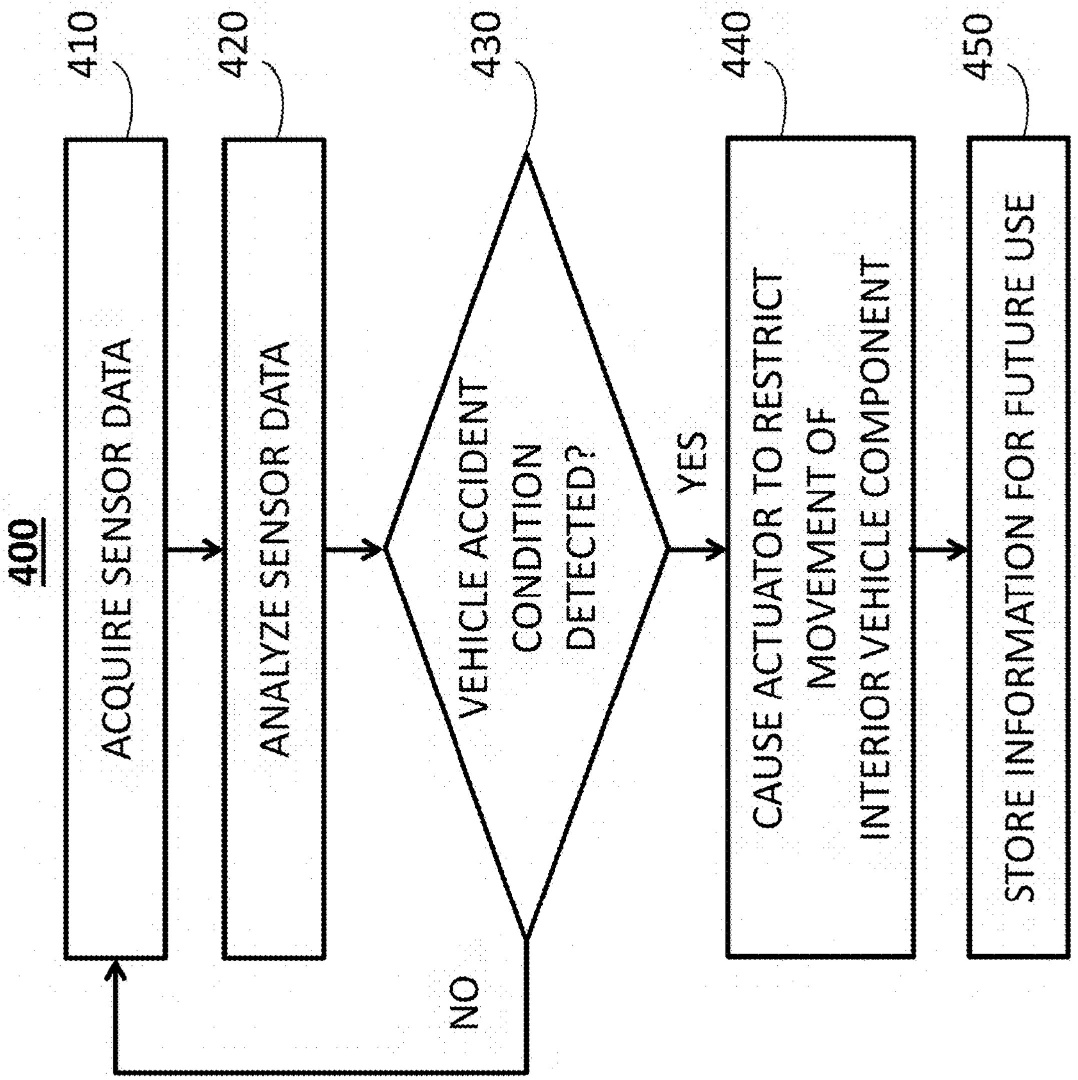
FIG. 4 illustrates a method for restricting the physical configuration of an interior vehicle component of a vehicle in response to a processor detecting a vehicle accident condition.

FIG. 4 illustrates a method 400 for restricting the physical configuration of the interior vehicle component of a vehicle in response to the processor detecting a vehicle accident condition. Steps 410, 420, 430, and 450 may be performed in the same manner as steps 310, 320, 330, and 360, respectively, of the method 300 as described with reference to FIG. 3, for example.

At step 440, in response to detecting the vehicle accident condition, an actuator program, stored in an actuator program memory (e.g., the actuator program memory 232 of FIG. 1B), is executed to cause an actuator component (e.g., the actuator component 130 of FIG. 1A) to restrict the physical configuration of the interior vehicle component (e.g., the interior vehicle component 140 of FIG. 1A). The actuator program causes the interior vehicle component to be restricted to the current physical configuration or a range of physical configurations between two physical configurations. The range of physical configurations to which the actuator component may be adjusted may be stored in a data storage (e.g., the IVC configuration data storage 234 of FIG. 1B).

In some embodiments, restricting the interior vehicle component to specific configurations is intended to protect/improve the safety of a vehicle passenger. For example, when the vehicle accident condition of a submerged vehicle is detected, and the interior vehicle component is a passenger seat, a safer physical configuration for the passenger seat is determined based on the sensor data. Accordingly, the passenger seat may have its configuration restricted to only being able to move in an upwards direction to prevent the passenger from becoming further submerged in the water, and potentially drowning.

In another embodiment, in response to detecting a vehicle accident condition, the physical configuration of the interior vehicle component may be restricted to a current physical configuration to prevent movement of the interior vehicle component and/or injury to a passenger. For example, when the interior vehicle component is a seatbelt and the vehicle has rolled over, the seatbelt may be restricted from being disengaged when the processor detects doing so would cause a vehicle passenger to fall out his/her passenger seat and suffer an injury. Conversely in another example, the actuator component may restrict movement of the interior vehicle component as a precaution. For example, following a collision, a processor may determine, based on collected passenger data, that a vehicle passenger may have suffered a spinal injury following the collision. Therefore, as a precaution, the processor may cause the actuator component to restrict movement of an interior vehicle component (e.g., a passenger seat, seatbelt, etc.) to keep the passenger stabilized until an emergency responder can aid the passenger.

After the actuator component has been executed to determine the range of physical configurations of the interior vehicle component, then at step 450, the physical configuration of the interior vehicle component may be restricted to a physical configuration within this range of physical configurations.

In some embodiments, multiple interior vehicle components are adjusted in response to the processor detecting a vehicle accident condition. In some embodiments the adjusted interior vehicle components are different elements. For example, in one embodiment, in response to detecting a vehicle accident condition such as a collision, the processor may cause a first actuator component to adjust the physical configuration of a passenger's seat and cause a second actuator component to roll down a window, to enable a passenger to safely exit the vehicle after the collision. In another example, in response to detecting a vehicle accident condition such as a roll over vehicle accident, the processor may cause a first actuator to open a window and a second actuator component to adjust the physical configuration of a passenger seat, to allow a passenger to exit a vehicle or to aid an emergency responder in extracting the passenger from the vehicle. The processor may also cause a third actuator component to disengage a seatbelt.

It should be appreciated that restricting the physical configuration of the interior vehicle component may not occur immediately after the vehicle accident condition is detected, and that there may be a lapse in time and/or a delay between when the vehicle accident condition is detected and the physical configuration of the interior vehicle component is restricted. It should also be appreciated that restricting movement of the interior vehicle component may only be temporary, or until another condition/factor is detected by the processor. A variety of factors may be taken into account by the processor in determining when to cause the actuator component to restrict the physical configuration. For example, following the detection of a collision (the vehicle accident condition) on a busy highway, a vehicle door (the interior vehicle component) may be restricted from being opened because the existence of oncoming traffic makes it unsafe for a passenger to exit the vehicle. Accordingly, the vehicle door may be restricted from being opened until there are no longer any vehicles approaching, and therefore it is safe for a passenger to exit the vehicle.

For embodiments in which multiple passengers are traveling in the vehicle 102, it should be appreciated that each passenger may have his/her own dedicated interior vehicle component 140. It should also be appreciated that each interior vehicle component 140 may be adjusted, or have its movement restricted, in the same, substantially similar, or different manner and/or physical configuration than other interior vehicle components of like kind. Further, the processor 202 may take into account the existence of other passengers and/or interior vehicle components in the vehicle 102 when determining the second physical configuration of the interior vehicle component 140. For example, in an embodiment in which two passengers are traveling in the vehicle 102 and each passenger is seated in a separate seat (the interior vehicle component 140), when the processor 202 detects a vehicle accident condition, the processor 202 would consider both passengers conditions and/or seats' physical configurations before adjusting either seat in order to avoid harming either passenger. Thus, for example, when the processor 202 determines the vehicle 102 has collided head-on with another vehicle, both seats may be adjusted backward to minimize injury to both passengers. Conversely, in an embodiment in which the processor 202 determines that another vehicle (external object 199) has T-boned the left side of the vehicle 102, the processor 202 may cause the actuator component 130 to move the left passenger seat backwards/forward because moving the left passenger seat laterally to the right is not possible due to a second passenger being seated on the right side of the vehicle in a passenger seat.

In some embodiments, the vehicle accident condition may be detected using machine learning techniques, such as cognitive learning, deep learning, combined learning, heuristic engines and algorithms, and/or pattern recognition techniques. For example, the processor 202 may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

In some embodiments, machine learning techniques may also, or instead, be utilized to determine when the existence of a vehicle accident condition is sufficiently hazardous to warrant adjusting or restricting the movement the physical configuration of the interior vehicle component, and/or to determine the best manner in which to adjust or restrict the physical configuration. In such embodiments, the sensor data may be considered in combination with each other and/or passenger data to evaluate whether the condition warrants adjusting or restricting the physical configuration of the interior vehicle component.

Additionally or alternatively, the machine learning programs may be trained by inputting sample data sets or certain data into the programs, such as image, mobile device, insurer database, and/or third-party database data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract the relevant data for one or more user device details, user request or login details, user device sensors, geolocation information, image data, the insurer database, a third-party database, and/or other data.

In one embodiment, a processor (and/or machine learning or heuristic engine or algorithm discussed herein) may be trained by providing it with a large sample of images and/or user data with known characteristics or features, such as historical vehicle data and/or past auto claim data. Based upon these analyses, the processing element may learn how to identify characteristics and patterns that may then be applied to analyzing user device details, user vehicle details, user device sensors, geolocation information, image data, the insurer database, a third-party database, and/or other data. For example, the processing element may learn, with the user's permission or affirmative consent, to identify the user and/or insured vehicles, and/or learn to identify insured vehicles characteristics. The processing element may also predict which vehicles are more prone to be classified as a total loss in the event of a vehicle collision, such as by vehicle characteristics determined from vehicle or other data.

The processing element and/or machine learning algorithm may determine historical storage, rental, or salvage time and/or costs typically expected with various types of vehicles or with vehicles having specific characteristics (e.g., make, model, mileage, age, etc.)—such as by analysis of scrubbed or depersonalized historical or past auto claim data. As such, a total loss may be predicted when a given vehicle is involved in a vehicle collision, and if so, the total loss cycle time may be reduced, and inconvenience to the insured may be reduced.

ADDITIONAL CONSIDERATIONS

Unless specifically stated otherwise, discussions herein using words such as "processing," "computing," "calculating," "determining," "detecting," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to an improvement to computer functionality, and improve the functioning of conventional computers.

What is claimed:

1. A system for controlling an interior configuration of a vehicle following a collision, the system comprising:

one or more processors configured to determine that an accident has occurred;

a vehicle component that is accessible from one or more of an interior or an exterior of the vehicle;

an actuator component configured to adjust a physical configuration of the vehicle component over a first range of physical configurations, and further configured to, when the one or more processors determine that an accident has occurred:

prevent a passenger from adjusting the vehicle component outside a predetermined second range of physical configuration while allowing the passenger to adjust the vehicle component within the predetermined second range of physical configurations, the predetermined second range of physical configurations being a subset of the first range of physical configurations that is smaller than the first range of physical configurations.

2. The system of claim 1, wherein the one or more processors are configured to:

determine that the accident has occurred at least by determining that the vehicle has rolled over, become submerged, is on fire, and/or collided with one or more objects external to the vehicle.

3. The system of claim 1, wherein the vehicle component is a seating apparatus.

4. The system of claim 1, wherein the vehicle component is a window.

5. The system of claim 4, wherein the one or more processors cause the actuator component to prevent the passenger from adjusting a position of the window below a predetermined lowest position.

6. The system of claim 1, wherein:

the vehicle component is a window or a seating apparatus; and the one or more processors are configured to determine that the accident has occurred at least by determining that the vehicle has become submerged.

7. The system of claim 1, further comprising:

one or more sensors configured to collect data corresponding to a state of the vehicle, an action of the vehicle, and/or an internal or external environment of the vehicle; and wherein the one or more processors are further configured to:

receive sensor data that includes, or is derived from data that includes, the data collected by the one or more sensors, and detect, by processing the sensor data, that the accident has occurred.

8. A method for controlling an interior configuration of a vehicle following a collision, the method comprising:

determining, by one or more processors, that an accident has occurred wherein an actuator component, that is configured to adjust a physical configuration of a vehicle component, that is accessible from one or more of an interior or an exterior of the vehicle, over a first range of physical configurations, is further configured to, when the one or more processors determine that an accident has occurred, prevent a passenger from adjusting the vehicle component outside a predetermined second range of physical configurations while allowing the passenger to adjust the vehicle component within the predetermined second range of physical configurations, the predetermined second range of physical configurations being a subset of the first range of physical configurations that is smaller than the first range of physical configurations.

9. The method of claim 8, wherein determining that the accident has occurred includes determining that the vehicle has rolled over, become submerged, is on fire, and/or collided with one or more objects external to the vehicle.

10. The method of claim 8, wherein the vehicle component is a seating apparatus.

11. The method of claim 8, wherein the vehicle component is a window.

12. The method of claim 11, wherein causing the actuator component to prevent the passenger from adjusting the vehicle component outside the predetermined second range of physical configurations includes causing the actuator component to prevent the passenger from adjusting a position of the window below a predetermined lowest position.

13. The method of claim 8, wherein:

the vehicle component is a window or a seating apparatus; and determining that the accident has occurred includes determining that the vehicle has become submerged.

14. The method of claim 8, further comprising:

receiving, by the one or more processors, sensor data from one or more sensors configured to collect data corresponding to a state of the vehicle, an action of the vehicle, and/or an internal or external environment of the vehicle; and detecting, by the one or more processors, by processing the sensor data, that the accident has occurred.

15. A non-transitory, computer-readable medium storing instructions that, when executed by one or more processors, cause the one or more processors to:

determine that an accident has occurred, wherein an actuator component, that is configured to adjust a physical configuration of a vehicle component, that is accessible from one or more of an interior or an exterior of a vehicle, over a first range of physical configurations, is further configured to, based on the one or more processors determining that an accident has occurred, prevent a passenger from adjusting the vehicle component outside a predetermined second range of physical configurations, while allowing the passenger to adjust the vehicle component within the predetermined second range of physical configurations, the predetermined second range of physical configurations being a subset of the first range of physical configurations that is smaller than the first range of physical configurations.

16. The non-transitory, computer-readable medium of claim 15, wherein determining that the accident has occurred includes determining that the vehicle has rolled over, become submerged, is on fire, and/or collided with one or more objects external to the vehicle.

17. The non-transitory, computer-readable medium of claim 15, wherein the vehicle component is a seating apparatus.

18. The non-transitory, computer-readable medium of claim 15, wherein the vehicle component is a window.

19. The non-transitory, computer-readable medium of claim 18, wherein causing the actuator component to prevent the passenger from adjusting the vehicle component outside the predetermined second range of physical configurations includes causing the actuator component to prevent the passenger from adjusting a position of the window below a predetermined lowest position.

20. The non-transitory, computer-readable medium of claim 15, wherein:

the vehicle component is a window or a seating apparatus; and determining that the accident has occurred includes determining that the vehicle has become submerged.

* * * * *